United States Patent
Doi et al.

(10) Patent No.: US 7,130,659 B2
(45) Date of Patent: Oct. 31, 2006

(54) RADIO BASE STATION, RADIO TERMINAL APPARATUS, MOBILE BODY COMMUNICATION SYSTEM, AND RECEPTION OPERATION CONTROL PROGRAM

(75) Inventors: Yoshiharu Doi, Gifu (JP); Seigo Nakao, Gifu (JP); Takeo Miyata, Gifu (JP); Tadayoshi Ito, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 146 days.

(21) Appl. No.: 10/486,082

(22) PCT Filed: Aug. 1, 2002

(86) PCT No.: PCT/JP02/07883

§ 371 (c)(1),
(2), (4) Date: Feb. 6, 2004

(87) PCT Pub. No.: WO03/015312

PCT Pub. Date: Feb. 20, 2003

(65) Prior Publication Data
US 2004/0242187 A1 Dec. 2, 2004

(30) Foreign Application Priority Data
Aug. 6, 2001 (JP) .............................. 2001-237798

(51) Int. Cl.
*H04Q 7/20* (2006.01)

(52) U.S. Cl. .................................. 455/561; 455/562.1

(58) Field of Classification Search ................. 455/561, 455/25, 101, 562.1, 272
See application file for complete search history.

(56) References Cited

U.S. PATENT DOCUMENTS

| | | | |
|---|---|---|---|
| 6,370,377 B1 | 4/2002 | Take et al. | |
| 6,553,078 B1 * | 4/2003 | Åkerberg | 375/267 |
| 6,711,382 B1 * | 3/2004 | Chiba et al. | 455/63.4 |
| 2002/0018530 A1 * | 2/2002 | Kim et al. | 375/267 |
| 2002/0072366 A1 | 6/2002 | Take et al. | |
| 2002/0077153 A1 | 6/2002 | Chiba et al. | |
| 2002/0123371 A1 * | 9/2002 | Miyoshi et al. | 455/562 |
| 2002/0168946 A1 * | 11/2002 | Aizawa et al. | 455/82 |

FOREIGN PATENT DOCUMENTS

EP    1 014 599 A1    6/2000

(Continued)

OTHER PUBLICATIONS

Chapter 3: MMSE Adaptive Array in "Adaptive Signal Processing by Array Antenna", Nobuyoshi Kikuma, Kagaku Gijutsu Shuppan, pp. 35-49.

(Continued)

*Primary Examiner*—Erika A. Gary
(74) *Attorney, Agent, or Firm*—McDermott Will & Emery LLP

(57) ABSTRACT

In response to a connection request from a terminal, a base station transmits to the terminal a signal instructing a reception operation appropriate to the transmission operation of the base station. According to this instruction signal, the terminal selects and executes an optimal reception operation. Moreover, the terminal gives its reception operation information to the base station in advance. According to this reception operation information, the base station transmits a reception instruction operation to the terminal. These processes are realized by software using DSP (12, 14) or the like.

40 Claims, 24 Drawing Sheets

FOREIGN PATENT DOCUMENTS

| | | |
|---|---|---|
| EP | 1014599 A1 | 6/2000 |
| JP | 2000-022611 | 1/2000 |
| JP | 2000-031874 | 1/2000 |
| JP | P2000-22611 A | 1/2000 |
| JP | P2000-31874 A | 1/2000 |
| JP | P2000-216724 A | 8/2000 |
| JP | P2000-218724 A | 8/2000 |
| JP | P2001-77750 A | 3/2001 |
| WO | WO 00/79702 A1 | 12/2000 |

OTHER PUBLICATIONS

"A Switching CMA/Diversity Antenna for Canceling Echoes with Fading in an FM Broadcasting Receiver", Takuya Otani, et al. B-472.

Chapter 3: MMSE Adaptive Array "In Adaptive Signal Processing by Array Antenna", Nobuyoshi Kikuma, Kegaku Gijutsu Shuppan, pp. 35-49, no date listed.

"A Switching CMA/Diversity Antenna for Cancelling Echoes with Fading in an FM Broadcasting Receiver", Takuya OTANI, et al. B-472, no date listed.

\* cited by examiner

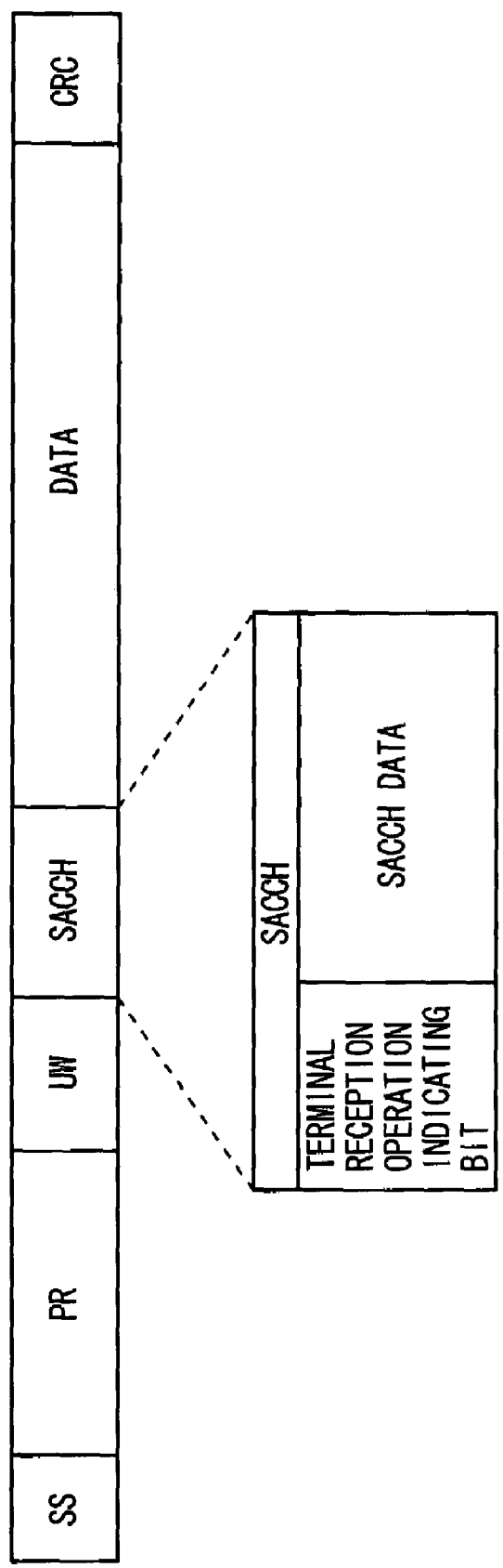
F I G. 4

F I G. 8
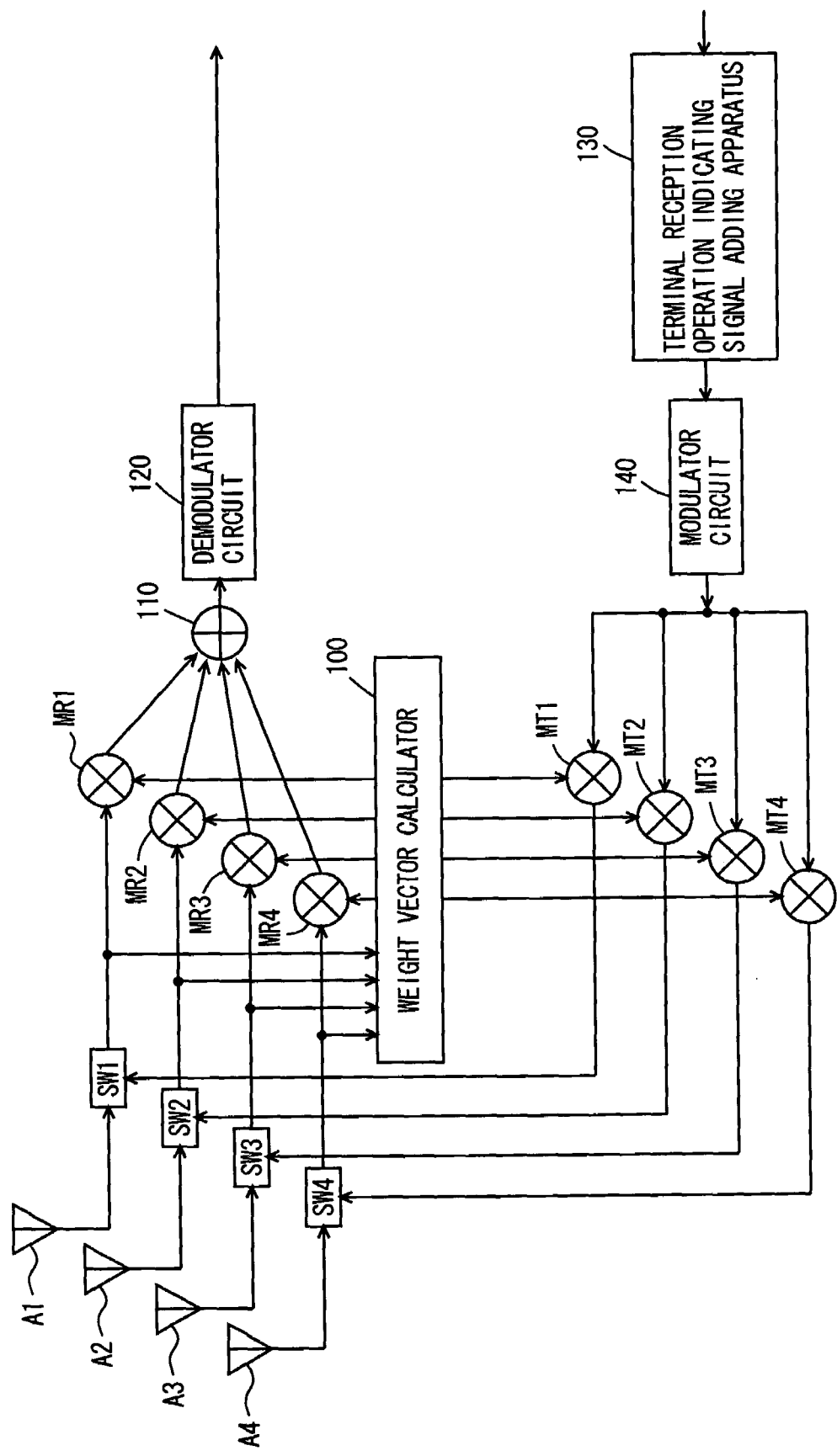

RADIO BASE STATION, RADIO TERMINAL APPARATUS, MOBILE BODY COMMUNICATION SYSTEM, AND RECEPTION OPERATION CONTROL PROGRAM

TECHNICAL FIELD

The present invention relates to a radio base station apparatus, a radio terminal apparatus, a mobile communication system and a reception operation control program thereof, and specifically, to a radio base station apparatus indicating a reception operation adapted to a transmission operation of the radio base station apparatus to a radio terminal apparatus in response to connection of the radio terminal apparatus, a radio terminal apparatus performing a reception operation in response to such an indication, a mobile communication system including such a radio base station apparatus and a radio terminal apparatus, and a reception operation control program for controlling such an operation.

BACKGROUND ART

Recently, in a mobile communication system (e.g., Personal Handyphone System: hereinafter referred to as PHS) that has been developing rapidly, PDMA (Path Division Multiple Access) scheme is proposed, in which radio terminal apparatuses (terminals) of a plurality of users can be connected to a radio base station apparatus (base station) in a spatial multiplexing manner, by spatially dividing an identical time slot of an identical frequency for improving the frequency effectiveness of a radio wave.

In this PDMA scheme, an adaptive array technique is currently employed, in which an uplink signal from each user's terminal antenna is received by an array antenna of a base station and extracted with reception directivity through an adaptive array process. A downlink signal to the terminal from the base station is transmitted from the array antenna with transmission directivity to the antenna of the terminal.

Such an adaptive array process is well known in the art and described in detail, for example, in "Chapter 3: MMSE Adaptive Array" in "Adaptive Signal Processing by Array Antenna", Nobuyoshi Kikuma, Kagaku Gijutsu Shuppan, pp. 35–49. Thus, description on its operation principle is not given herein. Further, specific arrangement of a radio apparatus employing the adaptive array processing is well known in the art, as disclosed in detail in International Publication No. WO00/79702 of the present applicant.

In the following, a base station that performs downlink transmission directivity control using such an adaptive array process is referred to as an adaptive array base station.

As for a terminal, one performing selective diversity reception (hereinafter referred to as diversity reception) using a plurality of antennas is known. In reception, such a terminal operates to select one antenna with higher reception level as a reception antenna from, for example, two antennas. Such a conventional diversity reception terminal performs the above mentioned diversity reception regardless of whether the base station to be connected is an adaptive array base station performing transmission directivity control or a nondirectional base station.

FIGS. 26A and 26B schematically show the connection states between terminals and adaptive array base stations, FIG. 26A showing the connection state between terminals not performing diversity reception and adaptive array base stations, and FIG. 26B showing the connection state between terminals performing diversity reception and adaptive array base stations.

Referring to FIG. 26A, as indicated by a bold arrow, a terminal 3 not performing diversity reception is connected to a desired adaptive array base station 1, and from an array antenna of adaptive array base station 1, a downlink signal is transmitted with transmission directivity to one antenna of terminal 3 that has transmitted an uplink signal. A hatched region D (D: Desired) indicates a state where a beam of signal wave is directed to terminal 3 from adaptive array base station 1.

In this case, terminal 3 can receive the downlink signal from adaptive array base station 1 at the maximum power due to the transmission directivity of desired adaptive array base station 1. The relationship between a terminal 4 not performing diversity reception and its desired adaptive array base station 2 is the same.

Though the signal wave from adaptive array base station 2 as indicated by a broken arrow U (U: Undesired) functions as an interference wave for terminal 3, as can be seen from the emission state of the signal wave in FIG. 26A, the signal power of the interference wave from adaptive array base station 2 received at terminal 3 is of the minimum. The relationship between terminal 4 not performing diversity reception and its non-desired adaptive array base station 1 is the same.

As above, an excellent connection state with less interference can be realized between a terminal not performing diversity reception and a desired adaptive array base station.

On the other hand, referring to FIG. 26B, for example a terminal 5 performing diversity reception transmits an uplink signal from one antenna 5a, establishing a connection relationship with adaptive array base station 1 as indicated by a bold arrow, similarly to the relationship shown in FIG. 26A. Hence, at antenna 5a of terminal 5, a downlink signal from desired adaptive array base station 1 is received at the maximum power, while a transmission signal from a non-desired adaptive array base station 2 (an interference wave) indicated by a broken (fine) arrow is received at the minimum power.

Since beam of signal wave D from desired adaptive array base station 1 is not directed to the other antenna 5b of terminal 5 not transmitting an uplink signal, the power of reception signal from adaptive array base station 1 decreases. Therefore, the power of interference wave U from non-desired adaptive array base station 2 indicated by a broken (bold) arrow relatively increases at antenna 5b.

The similar state occurs at antennas 6a and 6b of a terminal 6 performing diversity reception in the relationship with adaptive array base stations 1 and 2.

The similar problem arises in a spatial multiplexing base station realizing spatial multiple connection using such an adaptive array process. FIGS. 27A and 27B schematically indicate the connection states between terminals and base stations, FIG. 27A showing connection state between terminals not performing diversity reception and a spatial multiplexing base station, FIG. 27B showing connection state between terminals performing diversity reception and a spatial multiplexing base station.

Referring to FIG. 27A, as indicated by a bold arrow, terminals 30 and 40 not performing diversity reception are connected in spatial multiplexing manner to a desired base station 10 through the adaptive array process, and from an array antenna of spatial multiplexing base station 10, a downlink signal is transmitted with transmission directivity to one antenna of each of terminals 30 and 40 that has transmitted an uplink signal. A hatched region D indicates a state where a beam of signal wave is directed to each of terminals 30 and 40 from spatial multiplexing base station 10.

In this case, terminals 30 and 40 each can receive the downlink signal from base station 10 at the maximum power due to the transmission directivity of the desired base station 10.

As above, an excellent connection state with less interference can be realized between a terminal not performing diversity reception and a desired spatial multiplexing base station.

On the other hand, referring to FIG. 27B, for example a terminal 50 performing diversity reception transmits an uplink signal from one antenna 50*a*, establishing a connection relationship with spatial multiplexing base station 10 as indicated by a bold arrow, similarly to the relationship shown in FIG. 27A. Hence, at antenna 50*a* of terminal 50, a downlink signal from desired spatial multiplexing base station 10 is received at the maximum power.

Since beam of signal wave D from desired spatial multiplexing base station 10 is not directed to the other antenna 50*b* of terminal 50 not transmitting an uplink signal, the power of reception signal U from spatial multiplexing base station 10 decreases. Therefore, the power of interference wave from a non-desired base station that is not shown relatively increases at antenna 50*b*.

The similar state occurs for antennas 60*a* and 60*b* of a terminal 60 performing diversity reception.

As above, at a terminal performing diversity reception, regardless of whether a desired base station is an adaptive array base station controlling downlink transmission directivity, one antenna with higher reception level is selected from two antennas as a reception antenna. Therefore, for example in a terminal 5 of FIG. 26B, when a combined power of a low reception power from desired adaptive array base station 1 and a large interference wave U from non-desired adaptive array base station 2 received at antenna 5*b* not transmitting an uplink signal exceeds the reception power from a desired adaptive array base station 1 received at antenna 5*a* that has transmitted an uplink signal, antenna 5*b* is selected as a reception antenna.

In this case, the signal received at antenna 5*b* has a large power of interference wave U from non-desired adaptive array base station 2 relative to the downlink reception signal from desired adaptive array base station 1, and hence it is a signal with a large interference component, i.e., a signal with low so-called DU ratio (Desired user's power: Undesired user's power).

Even when an attempt is made to demodulate such a reception signal with low DU ratio at terminal 5, an error occurs in a frame of a demodulation signal and a correct demodulation fails. In special, when the power level of a downlink signal (interference wave) U from non-desired adaptive array base station 2 increases, in the worst case, terminal 5 may inappropriately demodulate a downlink signal that is transmitted to another user's terminal 6 from adaptive array base station 2.

Similar problem arises in the spatial multiplexing base stations shown in FIGS. 27A and 27B.

Thus, in the conventional mobile communication system, when a terminal that performs diversity reception is connected to an adaptive array base station (or a spatial multiplexing base station), the DU ratio at the terminal decreases, and its reception performance is degraded by an interference wave. Accordingly, there exist a problem that the effect of the adaptive array technique to reduce the frequency reuse distance (the minimum distance between base stations that can share the same frequency) is reduced.

It is noted that, as a terminal of a mobile communication system, in addition to the above-mentioned diversity terminal, there is a terminal of the type that performs transmission and reception with one antenna. Further, a terminal that is capable of performing adaptive array reception is possible. As for a base station, in addition to the base station that controls the downlink transmission directivity such as the above-mentioned adaptive array base station, there is also a nondirectional base station that does not perform such a directivity control.

In such a mobile communication system, it is necessary to cause the terminal to perform the reception operation that is adapted to a transmission operation of the base station as much as possible, and the examples in FIGS. 26A–27B only illustrate the cases where the reception operation of the terminal is not adapted to the transmission operation of the base station.

Therefore, an object of the present invention is to provide a radio base station apparatus, a radio terminal apparatus, a mobile communication system, and a reception operation control program thereof, which are capable of causing the terminal to perform a reception operation adapted to a transmission operation of the base station as much as possible.

Another object of the present invention is to provide a radio base station apparatus, a radio terminal apparatus, a mobile communication system, and a reception operation control program thereof, in which the reception performance of the terminal is not degraded even when the terminal is connected to the base station that controls downlink transmission directivity, such as an adaptive array base station or a spatial multiplexing base station.

DISCLOSURE OF THE INVENTION

One aspect of the present invention is a radio base station apparatus to which a radio terminal apparatus can connect, including: reception means for accepting a connection request from the radio terminal apparatus; and transmission means for transmitting to the radio terminal apparatus a signal indicating a reception operation adapted to a transmission operation of the radio base station apparatus in response to the connection request.

Preferably, the radio base station apparatus performs a transmission operation with transmission directivity to the radio terminal apparatus, and the transmission means transmit a signal indicating an adaptive array reception operation to the radio terminal apparatus.

Preferably, the radio base station apparatus performs a transmission operation without transmission directivity to the radio terminal apparatus, and the transmission means transmit a signal indicating a diversity reception operation to the radio terminal apparatus.

Another aspect of the present invention is a radio terminal apparatus that can connect to a radio base station apparatus, wherein the radio base station apparatus includes transmission means for transmitting to the radio terminal apparatus a signal indicating a reception operation adapted to the transmission operation of the radio base station apparatus in response to a connection request from the radio terminal apparatus. The radio terminal apparatus includes means for performing a connection request to the radio base station apparatus to connect to, means for receiving a signal indicating the reception operation transmitted from the radio base station apparatus in response to the connection request, means for determining whether the reception operation indicated by the received signal is possible to be performed or not, and reception operation control means for performing the indicated reception operation when the indicated reception operation is determined possible to be performed, and for performing a prescribed reception operation when the indicated reception operation is determined impossible to be performed.

Preferably, the radio base station apparatus to be connected performs a transmission operation with transmission directivity to the radio terminal apparatus, and the transmission means transmit a signal indicating an adaptive array reception operation to the radio terminal apparatus.

Preferably, the radio terminal apparatus is a radio terminal apparatus performing transmission and reception with one antenna, and the reception operation control means perform a reception operation with the one antenna in response to the signal indicating the adaptive array reception operation.

Preferably, the radio terminal apparatus is a radio terminal apparatus that can perform diversity reception with a plurality of antennas, and the reception operation control means perform a reception operation in which an antenna used for a signal transmission to the radio base station apparatus among the plurality of antennas is used for an immediately following reception operation from the radio base station apparatus in response to the signal indicating the adaptive array reception operation.

Preferably, the radio terminal apparatus is a radio terminal apparatus that can perform the adaptive array reception with a plurality of antennas, and the reception operation control means perform the adaptive array reception operation in response to the signal indicating the adaptive array reception operation.

Preferably, the radio base station apparatus to be connected performs a transmission operation without transmission directivity to the radio terminal apparatus, and the transmission means transmit a signal indicating a diversity reception operation to the radio terminal apparatus.

Preferably, the radio terminal apparatus is a radio terminal apparatus performing transmission and reception with one antenna, and the reception operation control means perform a reception operation with the one antenna in response to the signal indicating the diversity reception operation.

Preferably, the radio terminal apparatus is a radio terminal apparatus that can perform diversity reception with a plurality of antennas, and the reception operation control means perform the diversity reception operation in response to the signal indicating the diversity reception operation.

Preferably, the radio terminal apparatus is a radio terminal apparatus that can perform adaptive array reception with a plurality of antennas, and the reception operation control means perform the diversity reception operation in response to the signal indicating the diversity reception operation.

Preferably, the prescribed reception operation that is performed when the indicated reception operation is determined impossible to be performed is a reception operation in which an antenna used for a signal transmission to the radio base station apparatus among the plurality of antennas is used for an immediately following reception operation from the radio base station apparatus.

Preferably, the prescribed reception operation that is performed when the indicated reception operation is determined impossible to be performed is the adaptive array reception operation.

Still another aspect of the present invention is a mobile communication system including a radio base station apparatus and a radio terminal apparatus. The radio base station apparatus includes reception means for accepting a connection request from the radio terminal apparatus, and transmission means for transmitting to the radio terminal apparatus a signal indicating a reception operation adapted to a transmission operation of the radio base station apparatus in response to the connection request. The radio terminal apparatus includes means for performing a connection request to the radio base station apparatus to connect to, means for receiving a signal indicating the reception operation transmitted from the radio base station apparatus in response to the connection request, means for determining whether the reception operation indicated by the received signal is possible to be performed or not, and reception operation control means for performing the indicated reception operation when the indicated reception operation is determined possible to be performed, and for performing a prescribed reception operation when the indicated reception operation is determined impossible to be performed.

Preferably, the radio base station apparatus to be connected performs a transmission operation with transmission directivity to the radio terminal apparatus, and the transmission means transmit to the radio terminal apparatus a signal indicating an adaptive array reception operation.

Preferably, the radio terminal apparatus is a radio terminal apparatus performing transmission and reception with one antenna, and the reception operation control means perform a reception operation with the one antenna in response to the signal indicating the adaptive array reception operation.

Preferably, the radio terminal apparatus is a radio terminal apparatus that can perform diversity reception with a plurality of antennas, and the reception operation control means perform a reception operation in which an antenna used for a signal transmission to the radio base station apparatus among the plurality of antennas is used for an immediately following reception operation from the radio base station apparatus in response to the signal indicating the adaptive array reception operation.

Preferably, the radio terminal apparatus is a radio terminal apparatus that can perform the adaptive array reception with a plurality of antennas, and the reception operation control means perform the adaptive array reception operation in response to the signal indicating the adaptive array reception operation.

Preferably, the radio base station apparatus to be connected performs a transmission operation without transmission directivity to the radio terminal apparatus, and the transmission means transmit a signal indicating a diversity reception operation to the radio terminal apparatus.

Preferably, the radio terminal apparatus is a radio terminal apparatus performing transmission and reception with one antenna, and the reception operation control means perform a reception operation with the one antenna in response to the signal indicating the diversity reception operation.

Preferably, the radio terminal apparatus is a radio terminal apparatus that can perform diversity reception with a plurality of antennas, and the reception operation control means perform the diversity reception operation in response to the signal indicating the diversity reception operation.

Preferably, the radio terminal apparatus is a radio terminal apparatus that can perform adaptive array reception with a plurality of antennas, and the reception operation control means perform the diversity reception operation in response to the signal indicating the diversity reception operation.

Preferably, the prescribed reception operation that is performed when the indicated reception operation is determined impossible to be performed is a reception operation in which an antenna used for a signal transmission to the radio base station apparatus among the plurality of antennas is used for an immediately following reception operation from the radio base station apparatus.

Preferably, the prescribed reception operation that is performed when the indicated reception operation is determined impossible to be performed is the adaptive array reception operation.

Still another aspect of the present invention is a reception operation control program for controlling, in a radio base station apparatus to which a radio terminal apparatus can connect, a reception operation of the radio terminal apparatus that is to connect to the radio base station apparatus, causing a computer to execute the steps of: accepting a connection request from the radio terminal apparatus; and transmitting to the radio terminal apparatus a signal indicating a reception operation adapted to a transmission operation of the radio base station apparatus in response to the connection request.

Preferably, the radio base station apparatus performs a transmission operation with transmission directivity to the radio terminal apparatus, and the step of transmitting the signal indicating the reception operation includes a step of transmitting to the radio terminal apparatus a signal indicating an adaptive array reception operation.

Preferably, the radio base station apparatus performs a transmission operation without transmission directivity to the radio terminal apparatus, and the step of transmitting a signal indicating the reception operation includes a step of transmitting to the radio terminal apparatus a signal indicating a diversity reception operation.

Still another aspect of the present invention is a reception operation control program for controlling a reception operation in a radio terminal apparatus that can connect to a radio base station apparatus, wherein the radio base station apparatus includes transmission means for transmitting to the radio terminal apparatus a signal indicating a reception operation adapted to a transmission operation of the radio base station apparatus in response to a connection request from the radio terminal apparatus. The reception operation control program causes a computer to execute the steps of: performing a connection request to the radio base station apparatus to be connected; receiving the signal indicating the reception operation transmitted from the radio base station apparatus in response to the connection request, determining whether the reception operation indicated by the received signal is possible to be performed or not, and when the indicated reception operation is determined possible to be performed, performing the reception operation, and when the indicated reception operation is determined impossible to be performed, performing a prescribed reception operation.

Preferably, the radio base station apparatus to be connected performs a transmission operation with transmission directivity to the radio terminal apparatus, and the transmission means transmit a signal indicating an adaptive array reception operation to the radio terminal apparatus.

Preferably, the radio terminal apparatus is a radio terminal apparatus performing transmission and reception with one antenna, and the step of performing the reception operation includes a step of performing a reception operation with the one antenna in response to the signal indicating the adaptive array reception operation.

Preferably, the radio terminal apparatus is a radio terminal apparatus that can perform diversity reception with a plurality of antennas, and the step of performing the reception operation includes a step of performing a reception operation in which an antenna used for a signal transmission to the radio base station apparatus among the plurality of antennas is used for an immediately following reception operation from the radio base station apparatus in response to the signal indicating the adaptive array reception operation.

Preferably, the radio terminal apparatus is a radio terminal apparatus that can perform the adaptive array reception with a plurality of antennas, and the step of performing the reception operation includes a step of performing the adaptive array reception operation in response to the signal indicating the adaptive array reception operation.

Preferably, the radio base station apparatus to be connected performs a transmission operation without transmission directivity to the radio terminal apparatus, and the transmission means transmit a signal indicating a diversity reception operation to the radio terminal apparatus.

Preferably, the radio terminal apparatus is a radio terminal apparatus performing transmission and reception with one antenna, and the step of performing the reception operation includes a step of performing a reception operation with the one antenna in response to the signal indicating the diversity reception operation.

Preferably, the radio terminal apparatus is a radio terminal apparatus that can perform diversity reception with a plurality of antennas, and the step of performing the reception operation includes a step of performing the diversity reception operation in response to the signal indicating the diversity reception operation.

Preferably, the radio terminal apparatus is a radio terminal apparatus that can perform adaptive array reception with a plurality of antennas, and the step of performing the reception operation includes a step of performing the diversity reception operation in response to the signal indicating the diversity reception operation.

Preferably, the prescribed reception operation that is performed when the indicated reception operation is determined impossible to be performed is a reception operation in which an antenna used for a signal transmission to the radio base station apparatus among the plurality of antennas is used for an immediately following reception operation from the radio base station apparatus.

Preferably, the prescribed reception operation that is performed when the indicated reception operation is determined impossible to be performed is the adaptive array reception operation.

Still another aspect of the present invention is a radio base station apparatus to which a radio terminal apparatus can connect, wherein the radio terminal apparatus includes means for transmitting terminal operation information identifying a type of a reception operation of the radio terminal apparatus to the radio base station apparatus. The radio base station apparatus includes reception means for accepting a connection request and the terminal operation information from the radio terminal apparatus, and indicating signal transmitting means for transmitting to the radio terminal apparatus a signal indicating a reception operation adapted to a transmission operation of the radio base station apparatus in response to the terminal operation information.

Preferably, the radio base station apparatus performs a transmission operation with transmission directivity to the radio terminal apparatus, and the indicating signal transmitting means include: means for determining whether the radio terminal apparatus is a radio terminal apparatus that can perform diversity reception with a plurality of antennas or not based on the terminal operation information; means for transmitting to the radio terminal apparatus a signal indicating a reception operation in which an antenna used for a signal transmission to the radio base station apparatus among the plurality of antennas is used for an immediately following reception operation from the radio base station apparatus, when the radio terminal apparatus is determined to be a radio terminal apparatus that can perform diversity reception; means for determining whether the radio terminal apparatus is a radio terminal apparatus that can perform adaptive array reception with a plurality of antennas or not based on the terminal operation information; means for transmitting to the radio terminal apparatus a signal indicating the adaptive array reception operation, when the radio terminal apparatus is determined to be a radio terminal apparatus that can perform adaptive array reception; means for determining whether the radio terminal apparatus is a radio terminal apparatus that performs transmission and reception with one antenna or not based on the terminal operation information; means for transmitting to the radio terminal apparatus a signal indicating a reception operation fixing to the one antenna, when the radio terminal apparatus is determined to be a radio terminal apparatus that performs transmission and reception with one antenna; and means for transmitting to the radio terminal apparatus a signal indicating a reception operation fixing to a specific antenna, when the radio terminal apparatus is determined not to be any of a radio terminal apparatus that can perform diversity reception, a radio terminal apparatus that can perform adaptive array reception, and a radio terminal apparatus performing transmission and reception with one antenna based on the terminal operation information.

Preferably, the radio base station apparatus performs a transmission operation without transmission directivity to the radio terminal apparatus, and the indicating signal transmitting means include: means for determining whether the radio terminal apparatus is a radio terminal apparatus that can perform diversity reception with a plurality of antennas or not based on the terminal operation information; means for transmitting to the radio terminal apparatus a signal indicating a diversity reception operation, when the radio terminal apparatus is determined to be a radio terminal apparatus that can perform diversity reception; means for determining whether the radio terminal apparatus is a radio terminal apparatus that can perform adaptive array reception with a plurality of antennas or not based on the terminal operation information; means for transmitting to the radio terminal apparatus a signal indicating the adaptive array reception operation, when the radio terminal apparatus is determined to be a radio terminal apparatus that can perform adaptive array reception; means for determining whether the radio terminal apparatus is a radio terminal apparatus that performs transmission and reception with one antenna or not based on the terminal operation information; means for transmitting to the radio terminal apparatus a signal indicating a reception operation fixed to the one antenna, when the radio terminal apparatus is determined to be a radio terminal apparatus that performs transmission and reception with one antenna; and means for transmitting to the radio terminal apparatus a signal indicating a reception operation fixing to a specific antenna, when the radio terminal apparatus is determined not to be any of a radio terminal apparatus that can perform diversity reception, a radio terminal apparatus that can perform adaptive array reception, and a radio terminal apparatus performing transmission and reception with one antenna based on the terminal operation information.

Still another aspect of the present invention is a radio terminal apparatus that can connect to a radio base station apparatus, wherein the radio base station apparatus includes transmission means for transmitting to the radio terminal apparatus a signal indicating a reception operation adapted to a transmission operation of the radio base station apparatus in response to terminal operation information identifying a type of a reception operation of the radio terminal apparatus from the radio terminal apparatus. The radio terminal apparatus includes: means for performing a connection request to the radio base station apparatus to connect to; means for transmitting the terminal operation information to the base station to connect to; means for receiving a signal indicating the reception operation transmitted from the radio base station apparatus in response to the terminal operation information; and means for performing the reception operation indicated by the received signal.

Still another aspect of the present invention is a mobile communication system including a radio base station apparatus and a radio terminal apparatus. The radio base station apparatus includes reception means for receiving a connection request and terminal operation information identifying a type of reception operation of the radio terminal apparatus from the radio terminal apparatus, and indicating signal transmission means for transmitting to the radio terminal apparatus a signal indicating a reception operation adapted to the transmission operation of the radio base station apparatus in response to the terminal operation information. The radio terminal apparatus includes means for performing the connection request to the radio base station apparatus to connect to, means for transmitting the terminal operation information to the base station to connect to, means for receiving a signal indicating the reception operation transmitted from the radio base station apparatus in response to the terminal operation information, and means for performing the reception operation indicated by the received signal.

Preferably, the radio base station apparatus performs a transmission operation with transmission directivity to the radio terminal apparatus, the indicating signal transmitting means include: means for determining whether the radio terminal apparatus is a radio terminal apparatus that can perform diversity reception with a plurality of antennas or not based on the terminal operation information; means for transmitting to the radio terminal apparatus a signal indicating a reception operation in which an antenna used for a signal transmission to the radio base station apparatus among the plurality of antennas is used for an immediately following reception operation from the radio base station apparatus, when the radio terminal apparatus is determined to be a radio terminal apparatus that can perform diversity reception; means for determining whether the radio terminal apparatus is a radio terminal apparatus that can perform adaptive array reception with a plurality of antennas or not based on the terminal operation information; means for transmitting to the radio terminal apparatus a signal indicating the adaptive array reception operation, when the radio terminal apparatus is determined to be a radio terminal apparatus that can perform adaptive array reception; means for determining whether the radio terminal apparatus is a radio terminal apparatus that performs transmission and reception with one antenna or not based on the terminal operation information; means for transmitting to the radio terminal apparatus a signal indicating a reception operation fixed to the one antenna, when the radio terminal apparatus is determined to be a radio terminal apparatus that performs transmission and reception with one antenna; and means for transmitting to the radio terminal apparatus a signal indicating a reception operation fixing to a specific antenna, when the radio terminal apparatus is determined not to be any of a radio terminal apparatus that can perform diversity reception, a radio terminal apparatus that can perform adaptive array reception, and a radio terminal apparatus performing transmission and reception with one antenna based on the terminal operation information.

Preferably, the radio base station apparatus performs a transmission operation without transmission directivity to the radio terminal apparatus, and the indicating signal transmitting means include: means for determining whether the radio terminal apparatus is a radio terminal apparatus that can perform diversity reception with a plurality of antennas or not based on the terminal operation information; means for transmitting a signal indicating a diversity reception operation to the radio terminal apparatus, when the radio terminal apparatus is determined to be a radio terminal apparatus that can perform diversity reception; means for determining whether the radio terminal apparatus is a radio terminal apparatus that can perform adaptive array reception with a plurality of antennas or not based on the terminal operation information; means for transmitting a signal indicating the adaptive array reception operation to the radio terminal apparatus, when the radio terminal apparatus is determined to be a radio terminal apparatus that can perform adaptive array reception; means for determining whether the radio terminal apparatus is a radio terminal apparatus that performs transmission and reception with one antenna or not based on the terminal operation information; means for transmitting a signal indicating a reception operation fixing to the one antenna to the radio terminal apparatus, when the radio terminal apparatus is determined to be a radio terminal apparatus that performs transmission and reception with one antenna; and means for transmitting a signal indicating a reception operation fixing to a specific antenna to the radio terminal apparatus, when the radio terminal apparatus is determined not to be any of a radio terminal apparatus that can perform diversity reception, a radio terminal apparatus that can perform adaptive array reception, and a radio terminal apparatus performing transmission and reception with one antenna based on the terminal operation information.

Still another aspect of the present invention is a reception operation control program for controlling, in a radio base station apparatus to which a radio terminal apparatus can connect, a reception operation of a radio terminal apparatus that is to connect to the radio base station apparatus, wherein the radio terminal apparatus includes means for transmitting to the radio base station apparatus terminal operation information identifying a type of a reception operation of the radio terminal apparatus. The reception operation control program causes a computer to execute the steps of: receiving a connection request and the terminal operation information from the radio terminal information; and transmitting to the radio terminal apparatus a signal indicating a reception operation adapted to a transmission operation of the radio base station apparatus in response to the terminal operation information.

Preferably, the radio base station apparatus performs a transmission operation with transmission directivity to the radio terminal apparatus, the step of transmitting the indicating signal includes the steps of: determining whether the radio terminal apparatus is a radio terminal apparatus that can perform diversity reception with a plurality of antennas or not based on the terminal operation information; transmitting to the radio terminal apparatus a signal indicating a reception operation in which an antenna used for a signal transmission to the radio base station apparatus among the plurality of antennas is used for an immediately following reception operation from the radio base station apparatus, when the radio terminal apparatus is determined to be a radio terminal apparatus that can perform diversity reception; determining whether the radio terminal apparatus is a radio terminal apparatus that can perform adaptive array reception with a plurality of antennas or not based on the terminal operation information; transmitting to the radio terminal apparatus a signal indicating the adaptive array reception operation, when the radio terminal apparatus is determined to be a radio terminal apparatus that can perform adaptive array reception; determining whether the radio terminal apparatus is a radio terminal apparatus that performs transmission and reception with one antenna or not based on the terminal operation information; transmitting to the radio terminal apparatus a signal indicating a reception operation fixing to the one antenna, when the radio terminal apparatus is determined to be a radio terminal apparatus that performs transmission and reception with one antenna; and transmitting to the radio terminal apparatus a signal indicating a reception operation fixing to a specific antenna, when the radio terminal apparatus is determined not to be any of a radio terminal apparatus that can perform diversity reception, a radio terminal apparatus that can perform adaptive array reception, and a radio terminal apparatus performing transmission and reception with one antenna based on the terminal operation information.

Preferably, the radio base station apparatus performs a transmission operation without transmission directivity to the radio terminal apparatus, and the step of transmitting an indicating signal includes the steps of: determining whether the radio terminal apparatus is a radio terminal apparatus that can perform diversity reception with a plurality of antennas or not based on the terminal operation information; transmitting to the radio terminal apparatus a signal indicating a diversity reception operation, when the radio terminal apparatus is determined to be a radio terminal apparatus that can perform diversity reception; determining whether the radio terminal apparatus is a radio terminal apparatus that can perform adaptive array reception with a plurality of antennas or not based on the terminal operation information; transmitting to the radio terminal apparatus a signal indicating the adaptive array reception operation, when the radio terminal apparatus is determined to be a radio terminal apparatus that can perform adaptive array reception; determining whether the radio terminal apparatus is a radio terminal apparatus that performs transmission and reception with one antenna or not based on the terminal operation information; transmitting to the radio terminal apparatus a signal indicating a reception operation fixing to the one antenna, when the radio terminal apparatus is determined to be a radio terminal apparatus that performs transmission and reception with one antenna; and transmitting to the radio terminal apparatus a signal indicating a reception operation fixing to a specific antenna, when the radio terminal apparatus is determined not to be any of a radio terminal apparatus that can perform diversity reception, a radio terminal apparatus that can perform adaptive array reception, and a radio terminal apparatus performing transmission and reception with one antenna based on the terminal operation information.

Still another aspect of the present invention is a reception operation control program for controlling a reception operation in a radio terminal apparatus that can connect to a radio base station apparatus, wherein the radio base station apparatus includes transmission means for transmitting to the radio terminal apparatus a signal indicating a reception operation adapted to a transmission operation of the radio base station apparatus in response to terminal operation information identifying a type of a reception operation of the radio terminal apparatus from the radio terminal apparatus. The reception operation control program causes a computer to perform the steps of: performing a connection request to the radio base station apparatus to be connected; transmitting the terminal operation information to the radio base station apparatus to connect to; receiving a signal indicating the reception operation transmitted from the radio base station apparatus in response to the terminal operation information; and performing the reception operation indicated by the received signal.

Therefore, according to the present invention, the terminal is caused to perform the reception operation adapted to the transmission operation of the base station to which the terminal attempts to connect, and therefore the reception operation of the terminal can be improved.

Further, according to the present invention, by indicating the reception operation adapted to the transmission operation of the base station from the base station to the terminal in response to the connection by the terminal to the base station, the reception performance of the terminal is prevented from degrading even when the terminal is connected to the base station controlling the downlink transmission directivity such as an adaptive array base station and a spatial multiplexing base station.

Still further, according to the present invention, by indicating the reception operation from the base station to the terminal further adapted to the transmission operation of the base station based on the terminal operation information transmitted from the terminal to the base station, the reception performance of the terminal is prevented from degrading even when the terminal is connected to the base station controlling the downlink transmission directivity such as an adaptive array base station and a spatial multiplexing base station.

BRIEF DESCRIPTION OF THE DRAWINGS

FIG. 4 is a schematic view showing still another example of a frame format used in the first embodiment of the present invention.

FIG. 8 is a functional block diagram showing a system configuration of a base station according to the first embodiment of the present invention.

BEST MODES FOR CARRYING OUT THE INVENTION

Figure 1:
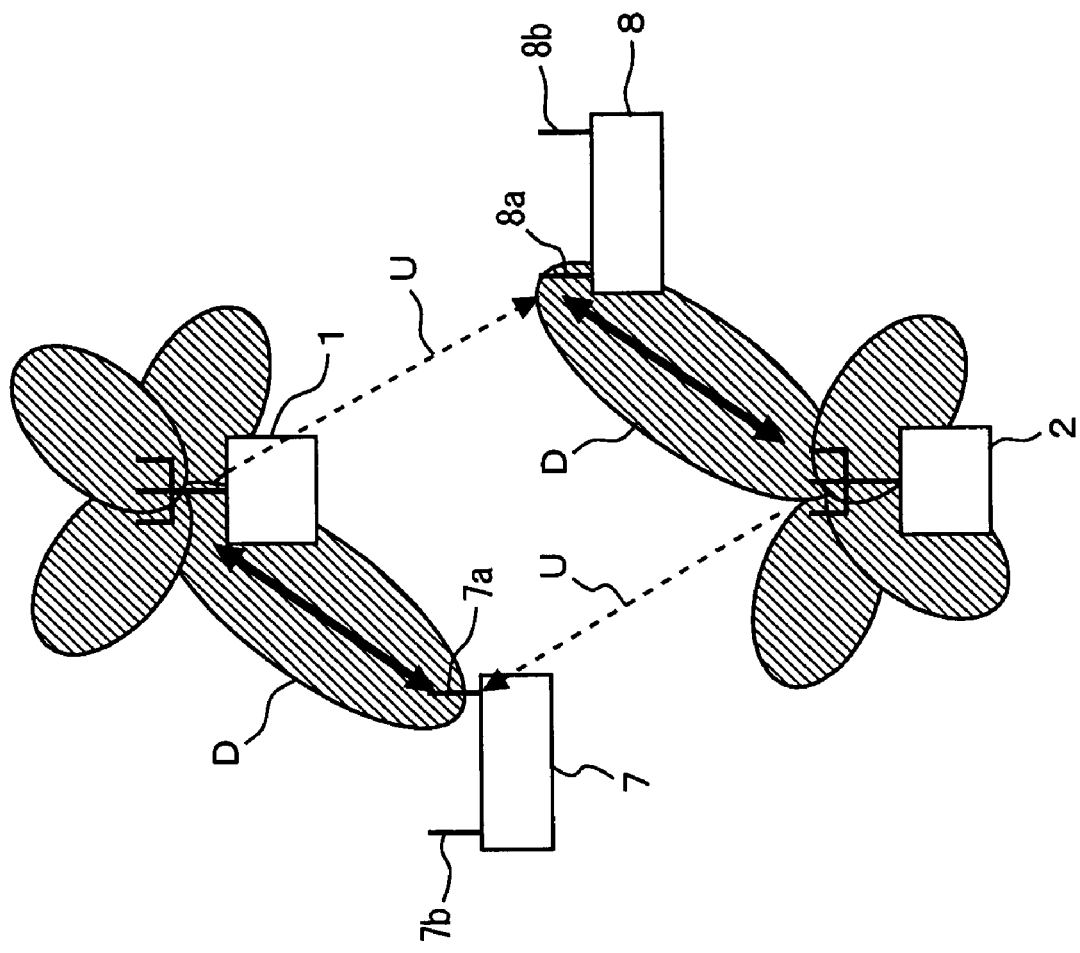
FIG. 1 is a conceptual view exemplary illustrating an operation principle of a first embodiment of the present invention.

In the following, embodiments of the present invention are described in detail referring to the figures. Throughout the figures, identical or corresponding parts are given the identical reference character, and description thereof is not repeated.

First Embodiment

FIG. 1 is a conceptual view exemplary showing an operation principle of a first embodiment of the present invention, and more specifically, it illustrates a connection state between terminals that can perform diversity reception with a plurality of antennas and adaptive array base stations.

Referring to FIG. 1, for example adaptive array stations 1 and 2 each transmit to a terminal requesting connection a signal indicating a reception operation of the terminal that is adapted to the transmission operation of the adaptive array base station performing downlink transmission directivity control.

Figure 26B:
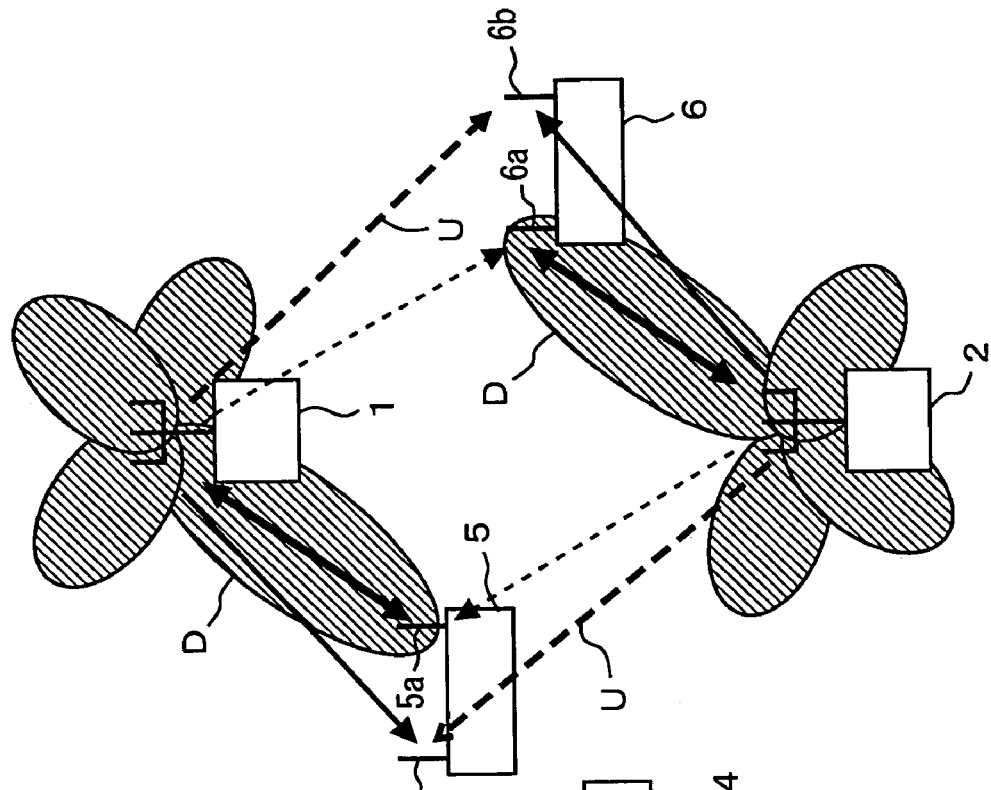
FIGS. 26A and 26B schematically show connection states of conventional terminals and base stations.

For example terminals 7 and 8 are the terminals that normally perform diversity reception, and when receiving the above described signal indicating the reception operation of the terminal from the base station to connect to, they stop to perform the selective diversity reception that is based on a reception level as indicated in FIG. 26B, and transit to, for example, a reception operation described below.

Specifically, in a transmission/reception to/from an adaptive array base station with transmission directivity, the transmission directivity of a downlink signal from an array antenna of the adaptive array base station is directed to the antenna of the terminal that has transmitted an uplink signal.

Therefore, according to the first embodiment of the present invention, a terminal is configured to receive a signal indicating a terminal reception operation corresponding to a transmission operation with transmission directivity from an adaptive array base station to connect to, and to stop the diversity operation in which reception antennas are switched in accordance with a reception level, and controls the antenna selection such that any of a plurality of (for example, two) antennas for diversity use that was used in a certain frame for transmitting an unlink signal to the base station is constantly used for receiving a downlink signal from the base station in the immediately following frame.

For instance, in the example of FIG. 1, when terminal 7 receives a signal indicating the terminal reception operation adapted to the transmitting operation with downlink transmission directivity by the adaptive array process from desired base station 1 to connect to, then the terminal uses one antenna 7a that was used for transmitting an uplink signal in a certain frame for receiving a downlink signal from an array antenna of base station 1 in the immediately following frame. As a result, the beam of signal wave D is directed to antenna 7a, establishing excellent connection between terminal 7 and base station 1 as indicated by a bold arrow and minimizing the level of interference wave U from non-desired base station 2.

Though not shown, when an uplink signal is transmitted to base station 1 by the other antenna 7b, this antenna 7b is likewise used for receiving a downlink signal from base station 1 in an immediately following frame, and an excellent connection is established, with the beam of signal wave D of base station 1 being directed to antenna 7b.

The relationship between terminal 8 that can perform diversity reception and its desired adaptive array base station 2 is the same.

Though terminals 7 and 8 are the terminals capable of performing the diversity reception in the example of FIG. 1, the terminals capable of performing not only the diversity reception but also the adaptive array reception using a plurality of antennas can also be realized. Specifically, the operations of the diversity reception and the adaptive array reception are the well known technique, and the terminal that selectively performs the diversity reception and the adaptive array reception can easily be realized with software using a plurality of antennas and a digital signal processor.

Such a terminal attains better reception with excellent reception directivity and without undesired interference waves, by selecting the adaptive array reception. Accordingly, the adaptive array base station can indicate to the terminal the adaptive array reception as the terminal reception operation adapted to the transmission operation of the base station.

Specific operations of the base station and the terminal in those various cases will be detailed later.

Figure 2:
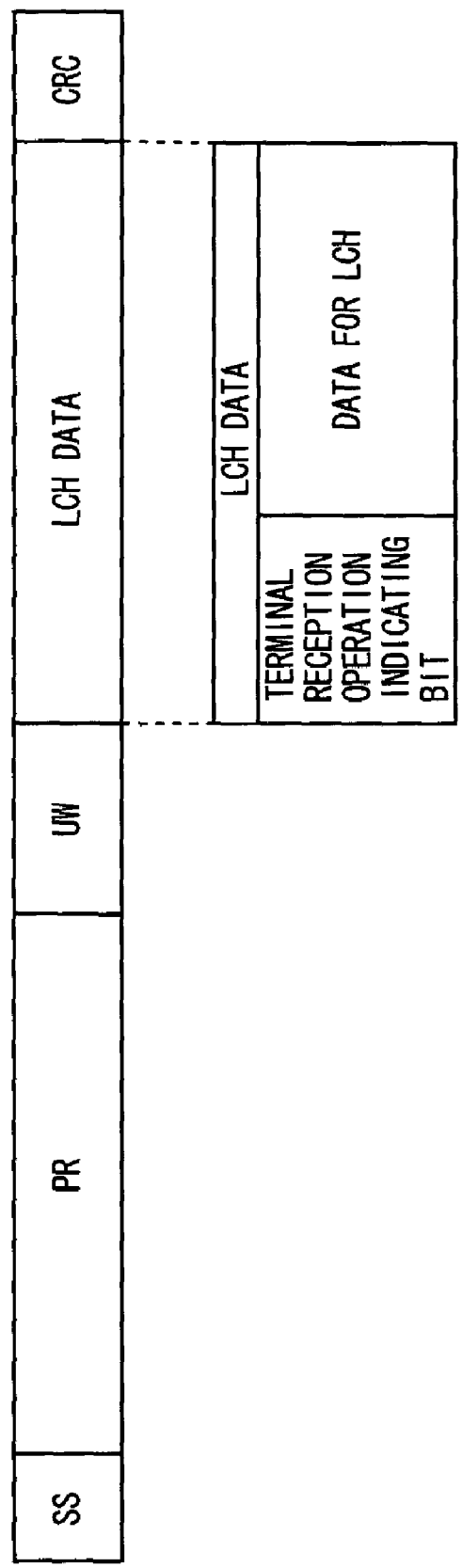
FIG. 2 is a schematic view showing an example of a frame format used in the first embodiment of the present invention.
Figure 3:
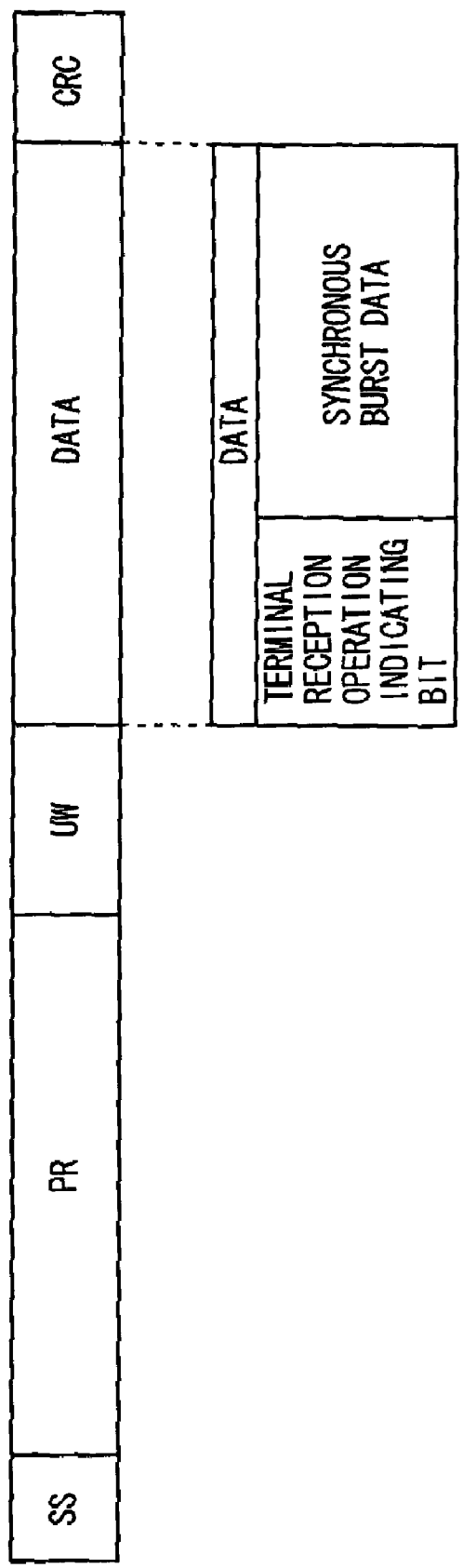
FIG. 3 is a schematic view showing another example of a frame format used in the first embodiment of the present invention.

FIGS. 2–4 are schematic views showing examples of frame formats used to indicate terminal reception operation in the first embodiment of the present invention.

As described above, in the first embodiment of the present invention, when requested connection by a terminal, each base station constituting the mobile communication system transmits at a prescribed timing a signal indicating the type of a transmission operation of the base station, more specifically, if the base station is an adaptive array base station that performs downlink transmission directivity control, indicating the reception operation of the terminal adapted to such a transmission operation.

FIG. 2 schematically shows a format of one frame of a downlink channel LCH allocation indication transmitted from each base station including such a terminal reception operation indicating signal.

Referring to FIG. 2, one frame of the LCH allocation indication from a base station is configured with a start symbol SS, a preamble PR, a unique word UW, data of link channel LCH, and an error checking bit CRC.

The data of link channel LCH can further be divided into an information bit for indicating reception operation of a terminal and data for link channel LCH.

FIG. 3 schematically shows a format of one frame of a downlink synchronous burst transmitted from each base station, including such a terminal reception operation indicating bit.

Referring to FIG. 3, one frame of the downlink synchronous burst transmitted from each base station is configured with a start symbol SS, a preamble PR, a unique word UW, data, and an error checking bit CRC.

The data can further be divided into an information bit for indicating the reception operation of a terminal and data for downlink synchronous burst.

FIG. 4 schematically shows a format of one frame of a downlink traffic channel TCH transmitted from each base station including such a terminal reception operation indicating bit.

Referring to FIG. 4, one frame of TCH from a base station is configured with a start symbol SS, a preamble PR, a unique word UW, a low speed associated control channel SACCH, data, and an error checking bit CRC.

The low speed associated control channel SACCH can further be divided into an information bit for indicating the reception operation of the terminal and data for SACCH.

It should be noted that the insert location of the identification information shown in FIGS. 2–4 is merely an example, and it may be inserted at any location in any frame of the downlink transmission signal.

Figure 5:
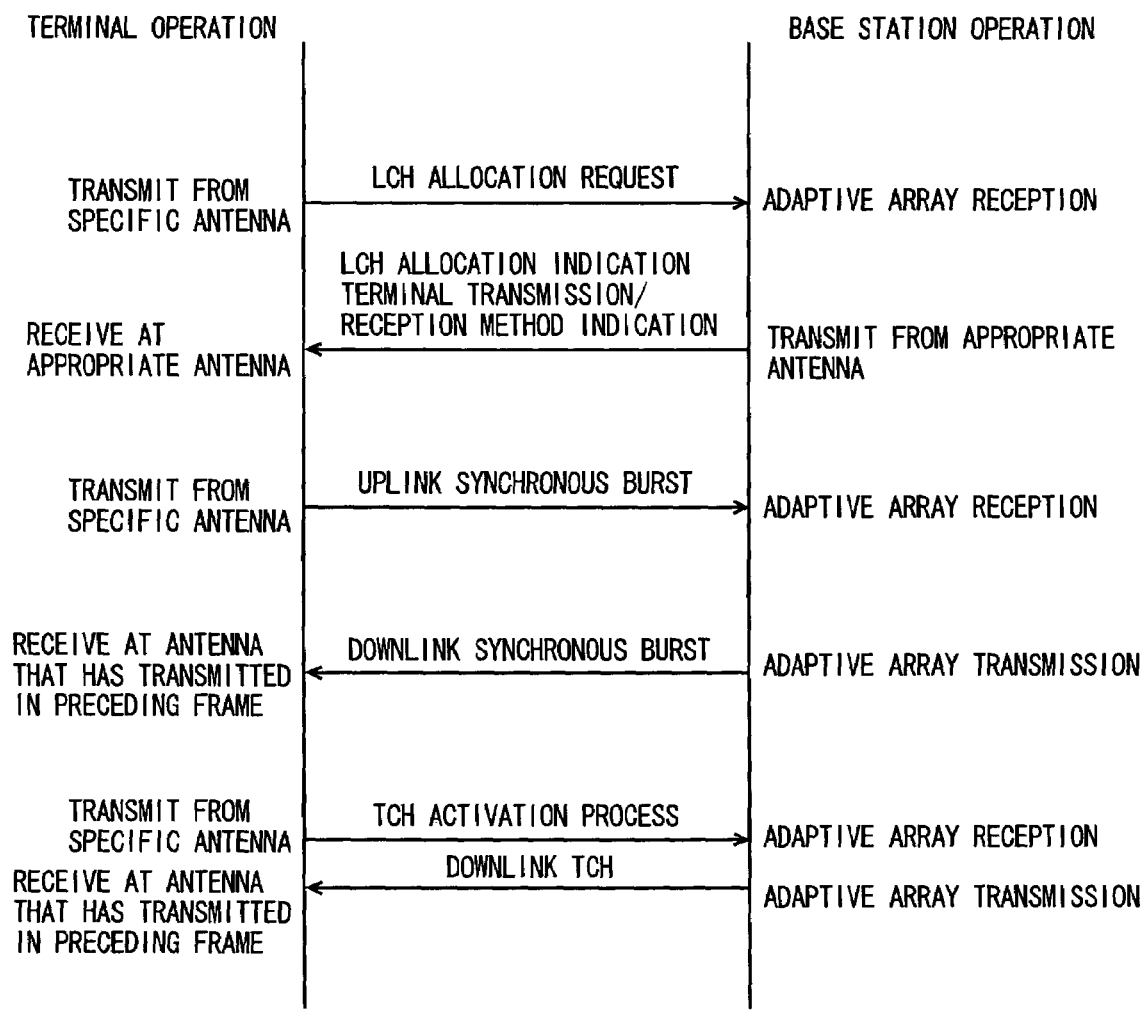
FIG. 5 is a timing diagram indicating a signal transmission/reception manner between a terminal and a base station according to the first embodiment of the present invention.
Figure 6:
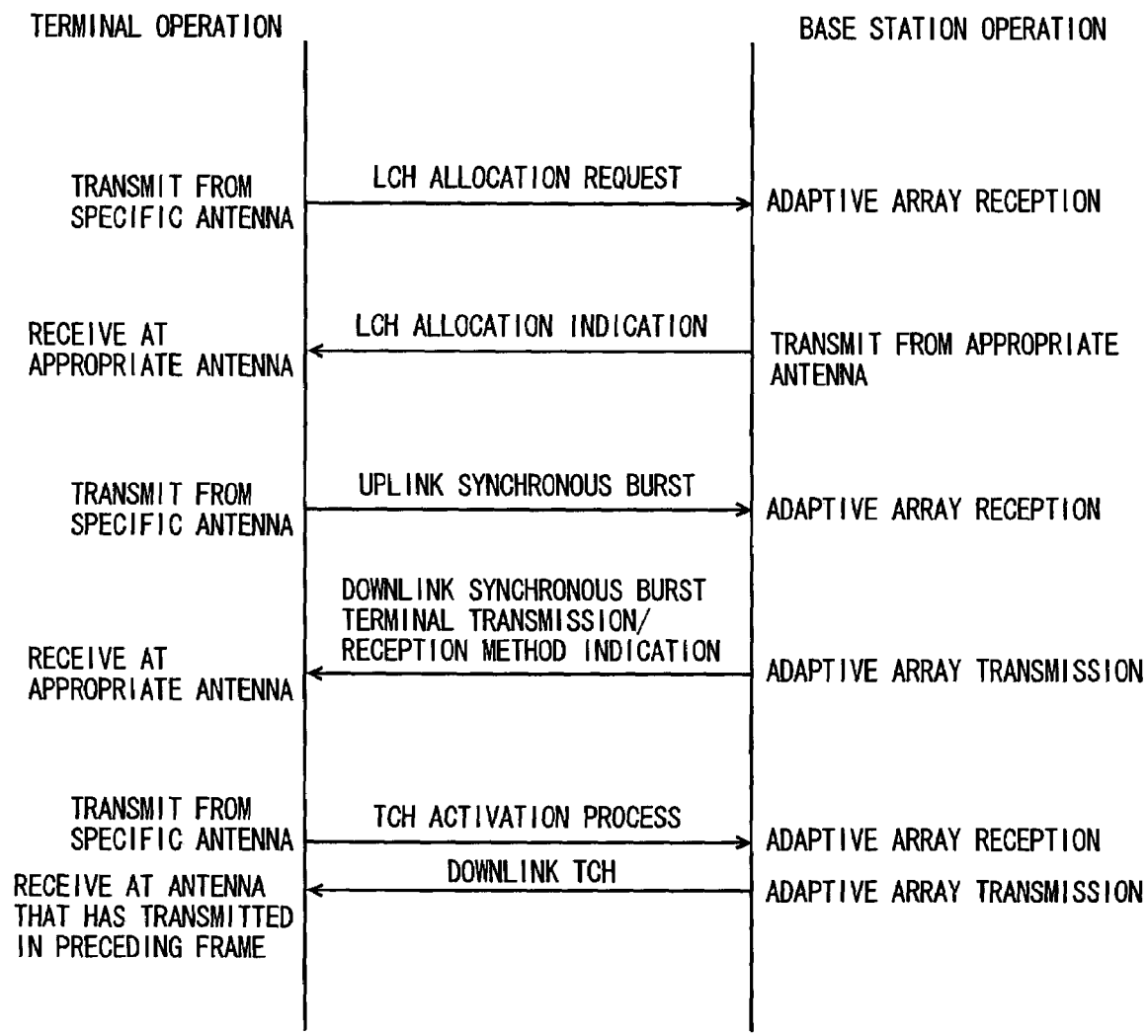
FIG. 6 is a timing diagram indicating another signal transmission/reception manner between a terminal and a base station according to the first embodiment of the present invention.
Figure 7:
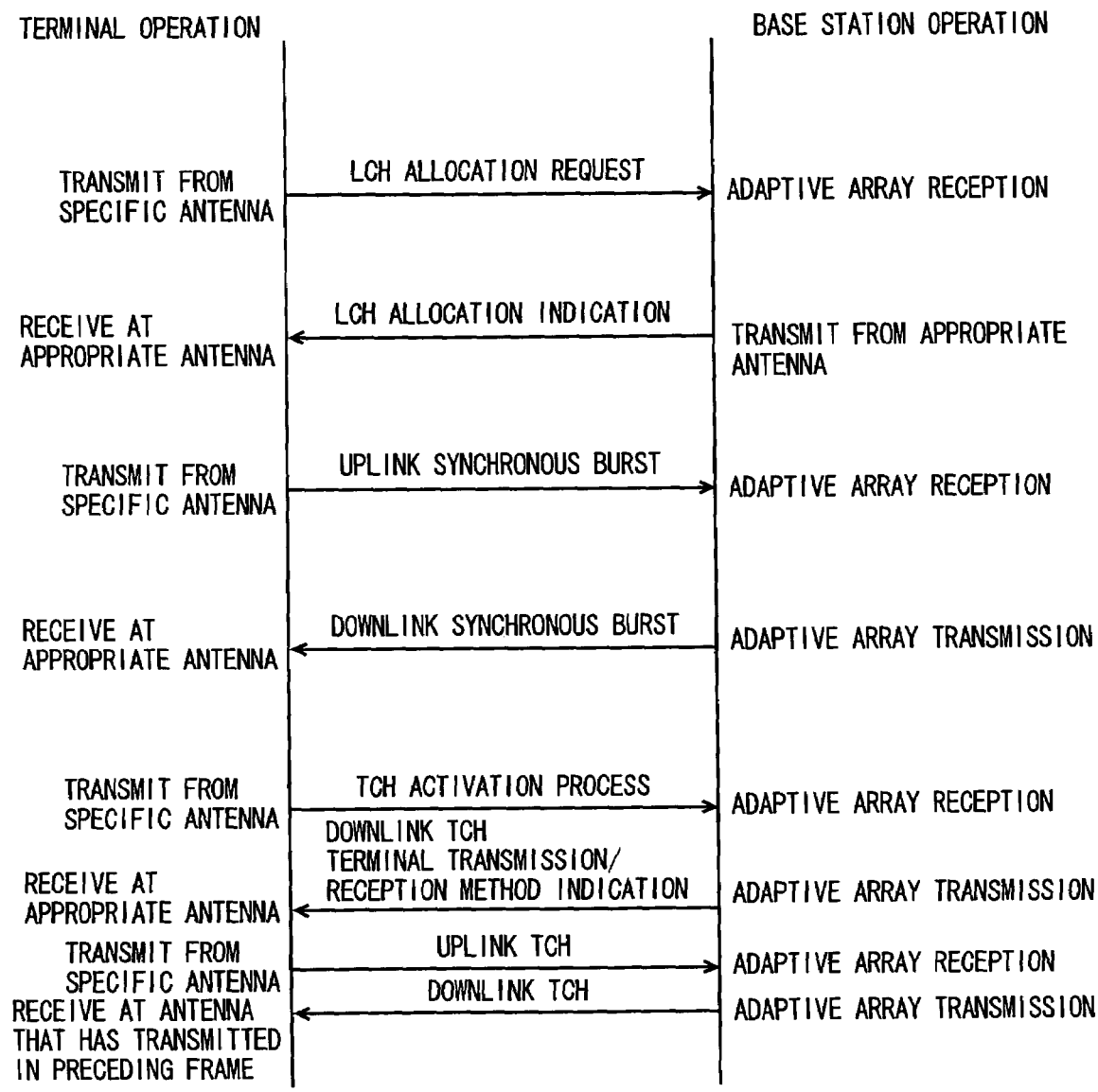
FIG. 7 is a timing diagram indicating still another signal transmission/reception manner between a terminal and a base station according to the first embodiment of the present invention.

Next, FIGS. 5–7 are timing diagrams indicating a manner of signal transmission/reception between a terminal (specifically, a diversity terminal) and a base station according to the first embodiment of the present invention.

Referring to FIG. 5, the terminal transmits the link channel LCH allocation request from a specific antenna among a plurality of antennas for diversity reception to the base station.

The adaptive array base station receives this uplink signal by the adaptive array operation, and transmits LCH allocation indication using an appropriate antenna in the next frame. The LCH allocation indication has the frame format shown in FIG. 2, and it is transmitted including the terminal reception operation indicating bit.

The terminal receives at an appropriate antenna the LCH allocation indication including the terminal reception operation indicating bit that has been transmitted from the base station.

The terminal received the indication changes to a reception method that is adapted to the indication from the base station. Specifically, from that point onward, it controls to use the antenna that was used to transmit the uplink signal for the reception of a downlink signal in the next frame.

First, the terminal transmits an uplink synchronous burst to the base station with a specific antenna among a plurality of antennas for the diversity reception.

The adaptive array base station receives this uplink synchronous burst by the adaptive array operation, and transmits a downlink synchronous burst in the next frame by the adaptive array operation.

The terminal receives this downlink synchronous burst, which has been transmitted from the base station with transmission directivity, with the antenna that had transmitted the uplink synchronous burst in the previous frame.

The terminal receives it and transmits a traffic channel TCH activation process to the base station with a particular antenna among a plurality of diversity reception antennas.

The adaptive array base station receives this traffic channel TCH activation process by the adaptive array operation, and transmits a downlink traffic channel TCH in the next frame by the adaptive array operation.

The terminal receives this downlink traffic channel TCH, which has been transmitted from the base station with transmission directivity, with the antenna that had transmitted the traffic channel TCH activation process in the previous frame.

Next, the timing diagram shown in FIG. 6 is different from the timing diagram of FIG. 5 in the following points. Specifically, in the example of FIG. 6, the downlink synchronous burst transmitted from the base station is transmitted to the terminal including the terminal reception operation indicating bit, and the downlink synchronous burst has the frame format shown in FIG. 3.

The terminal receives the downlink synchronous burst including the terminal reception operation indicating bit, and from that point onward, it controls to use the antenna that was used for transmitting the uplink signal for receiving a downlink signal in the next frame.

Next, the timing diagram shown in FIG. 7 is different from the timing diagrams of FIGS. 5 and 6 in the following points. Specifically, in the example of FIG. 7, traffic channel TCH (more specifically, low speed associated control channel SACCH included therein) transmitted from the base station is transmitted to the terminal including the terminal reception operation indicating bit, and the TCH has the frame format shown in FIG. 4.

The terminal receives TCH including the terminal reception operation indicating bit, and from that point onward, in the traffic channel, it controls to use the antenna that was used for transmitting the uplink signal for receiving a downlink signal in the next frame.

FIG. 8 is a functional block diagram showing a system configuration of a base station according to the first embodiment of the present invention for realizing above described operation principle.

Referring to FIG. 8, a reception signal vector configured by reception signals from the terminal respectively received at a plurality of antennas of the base station, for example four antennas A1–A4, is switched to the reception circuit side at switch circuits SW1–SW4, and converted by A/D converter, which is not shown, to digital signals, respectively.

The digital signals are provided to DSP, which is not shown, of the base station, and from this point onward, are subjected to the adaptive array process in a software-like manner in accordance with the functional block diagram shown in FIG. 8.

Referring to FIG. 8, the reception signals switched to the reception circuit side at switch circuits SW1–SW4 are provided to respective one inputs of multipliers MR1–MR4, as well as to a weight vector calculator 100.

Weight vector calculator 100 calculates a weight vector that consists of weights for respective antennas in accordance with an adaptive array algorithm that will be described later, and provides the weights to respective other inputs of multipliers MR1–MR4 for complex multiplication with the reception signals from corresponding antennas. An adder 110 provides an array output signal, which is the total sum of the complex multiplication results.

The result of the above described complex multiplication sum is demodulated to bit data by a demodulator circuit 120 before supplied as the array output signal.

With weight vector calculator 100, the adaptive array algorithm such as RLS (Recursive Least Squares) algorithm and SMI (Sample Matrix Inversion) algorithm are used.

Such RLS and SMI algorithms are well known techniques in the field of the adaptive array process, and described in detail as mentioned above, in "Chapter 3: MMSE Adaptive Array" in "Adaptive Signal Processing by Array Antenna", Nobuyoshi Kikuma, Kagaku Gijutsu Shuppan, pp. 35–49. Therefore, the description thereof is not repeated herein.

Further, a transmission signal from a transmission signal source, which is not shown, is modulated by a modulator circuit 140 via a terminal reception operation indicating signal adding apparatus 130, which will be described later, and provided to respective one input terminals of multipliers MT1–MT4. To respective other input terminals of MT1–MT4, the weights calculated by weight vector calculator 100 are copied and applied.

Thus, the transmission signals weighted by the complex multiplication with the weight vector will be selected by switch circuits SW1–SW4 and transmitted via antennas A1–A4.

The signals transmitted via antennas A1–A4 that were used for reception are weighted by the weight vector targeting a specific terminal similarly to the reception signal. Thus, the radio wave signal transmitted from these antennas will be emitted with the transmission directivity targeting the specific terminal.

It should be noted that terminal reception operation indicating signal adding apparatus 130 is, as shown in FIGS. 2–4, for inserting the terminal reception operation indicating bit at prescribed location in the downlink transmission signal frame.

Figure 9:
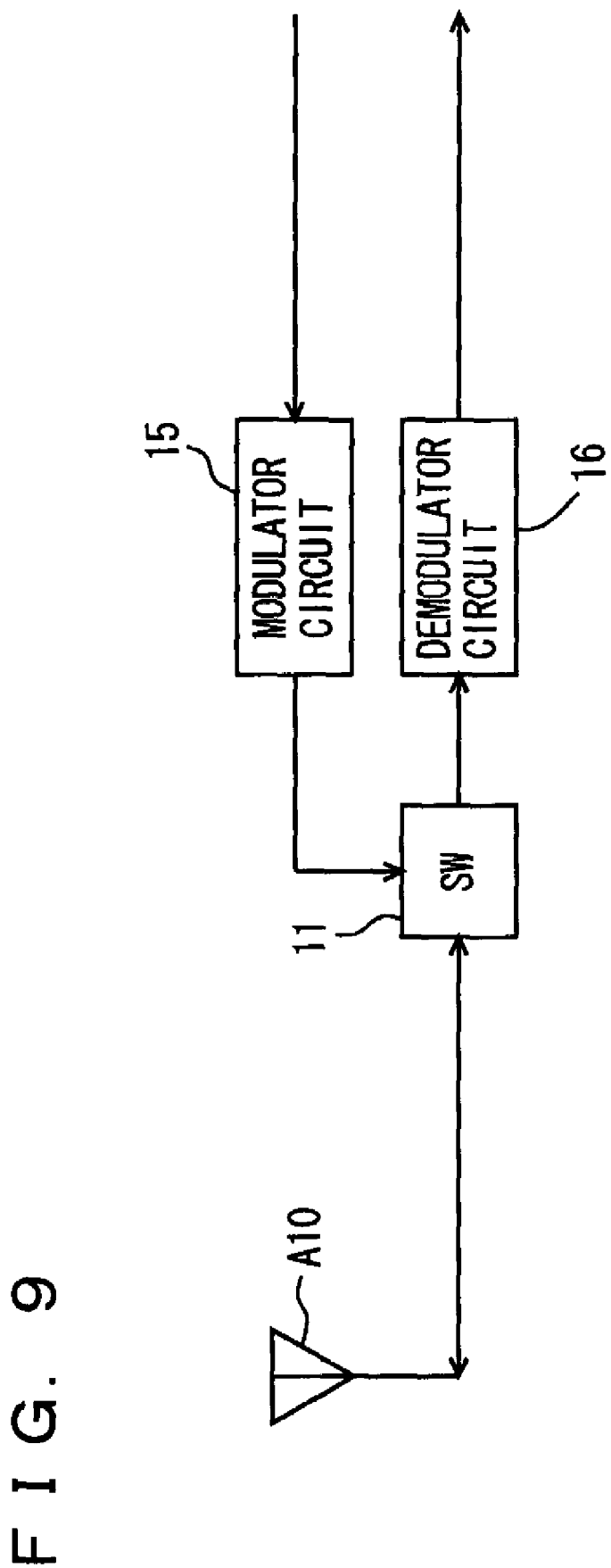
FIG. 9 is a functional block diagram showing a system configuration of a terminal according to the first embodiment of the present invention.
Figure 10:
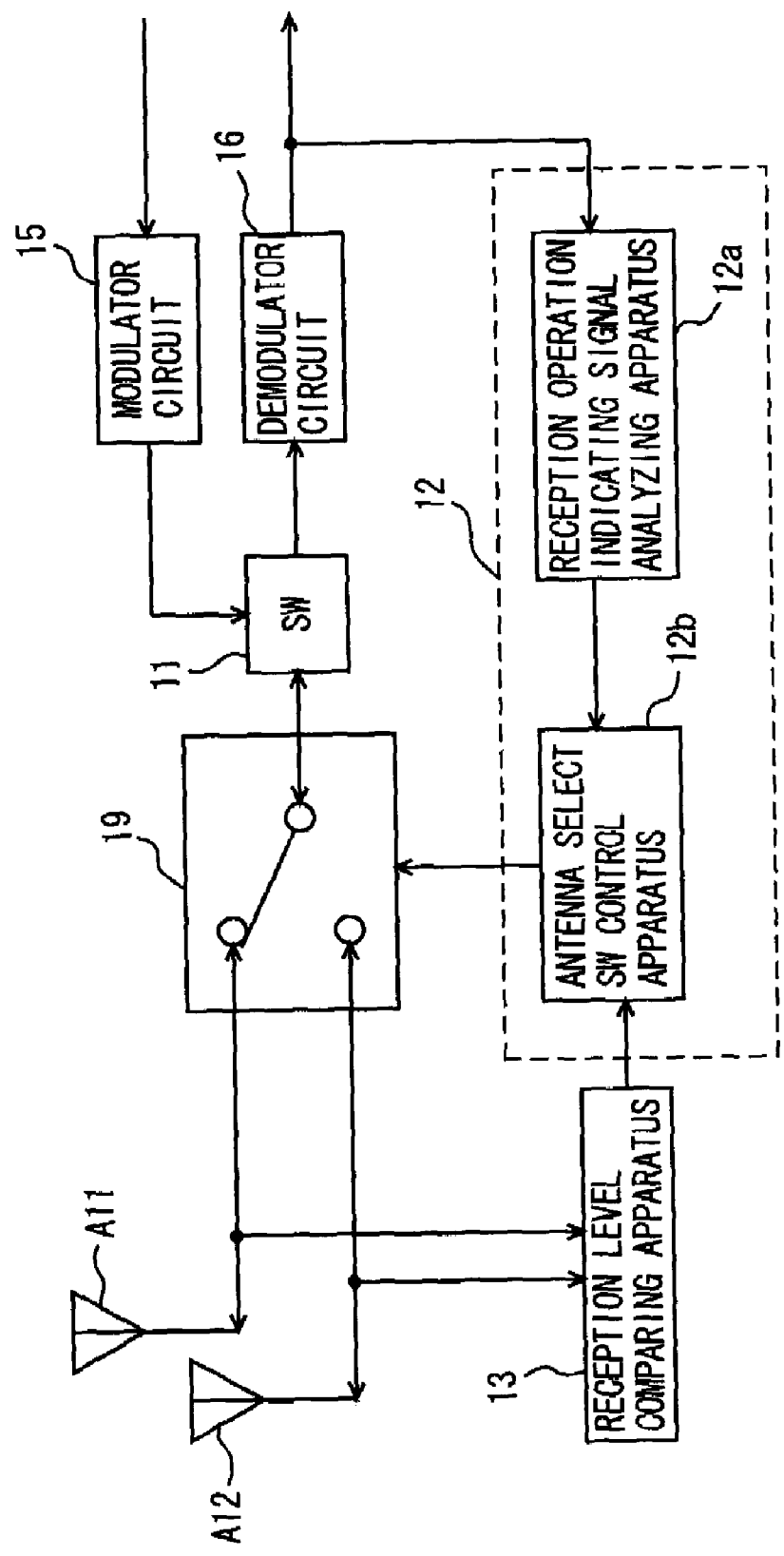
FIG. 10 is a functional block diagram showing a system configuration of another terminal according to the first embodiment of the present invention.
Figure 11:
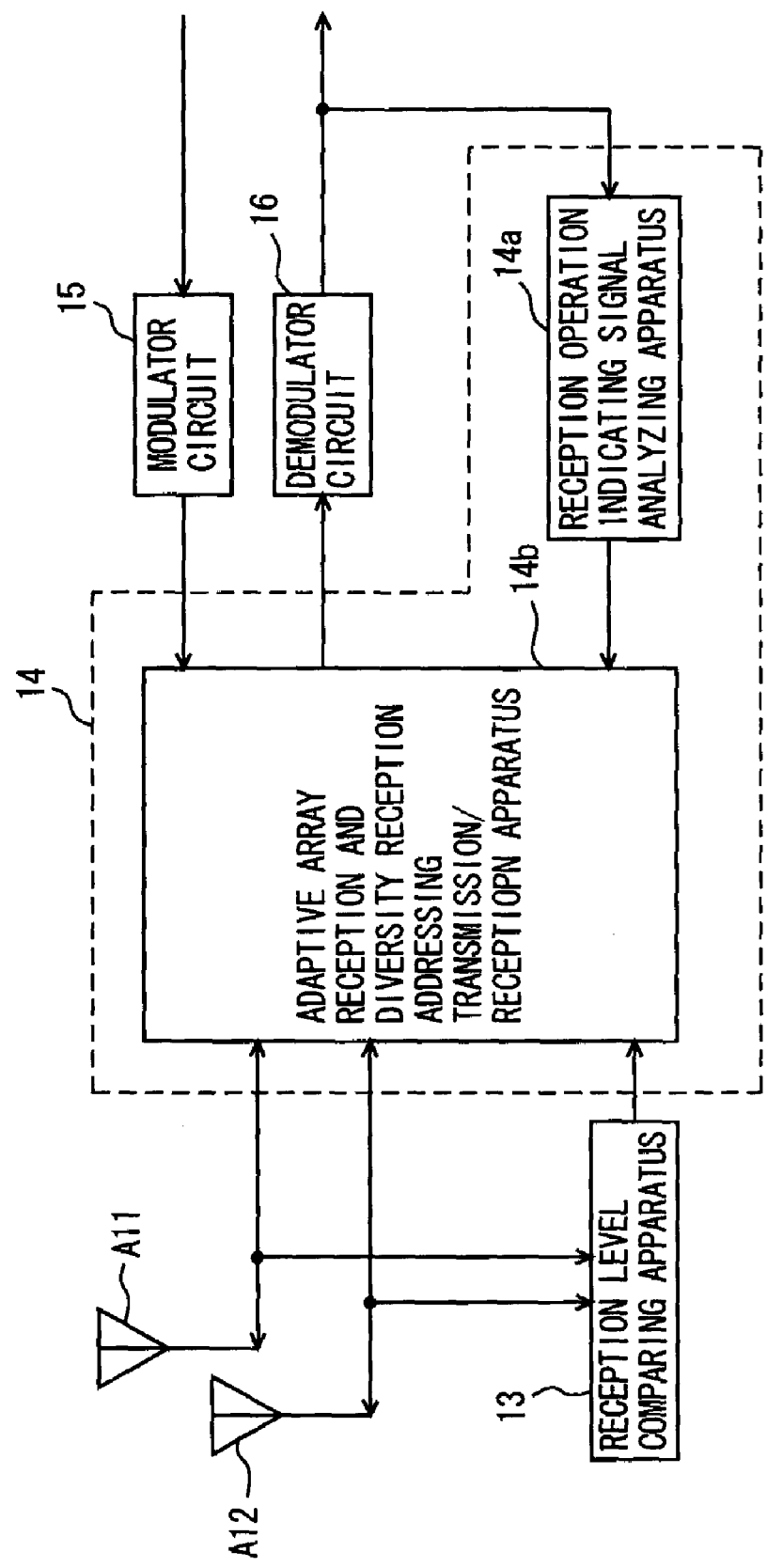
FIG. 11 is a functional block diagram showing a system configuration of still another terminal according to the first embodiment of the present invention.

Next, FIGS. 9–11 are functional block diagrams showing the system configuration of terminals according to the first embodiment of the present invention for realizing the above described operation principle.

First, the terminal shown in FIG. 9 is the terminal of the type performing transmission/reception with one antenna A10. In transmission, the output of modulator circuit 15 is selected at switch 11 and transmitted from antenna A10, and in reception the reception signal of antenna A10 is provided to demodulator circuit 16 via switch 11.

Next, the terminal shown in FIG. 10 is the terminal performing the diversity reception, and two antennas A11 and A12 are connected to two fixed terminals of an antenna select switch 19, while a movable terminal of switch 19 is connected to transmission/reception signal alternating circuit 11.

To switch 11, modulator circuit 15 and demodulator circuit 16 are connected. The output of demodulator circuit 16 is provided to digital signal processor DSP 12.

The outputs of antennas A11 and A12 are provided to a reception level comparing apparatus 13. The output of reception level comparing apparatus 13 is likewise provided to DSP 12. The inside of DSP indicated by a broken line 12 shows processes realized with software by DSP in functional blocks.

Specifically, the output of demodulator circuit 16 is provided to a reception operation indication signal analyzing apparatus 12a, of which output is provided to an antenna select switch controlling apparatus 12b. The output of reception level comparing apparatus 13 is likewise provided to antenna select switch controlling apparatus 12b.

The output of antenna select switch control apparatus 12b is provided to a switch-controlled input of antenna select switch 19.

Now, the operation of the terminal shown in FIG. 10 is described in detail. This terminal is capable of performing the diversity reception, and a normal diversity operation will be described.

First, in transmission, a signal from a signal source such as a microphone, which is not shown, is modulated by modulator circuit 15 and provided to a movable terminal of antenna select switch 19 via switch 11.

An uplink signal is transmitted by one antenna that is selected by this switch 19 from antennas A11 and A12.

In reception, the reception levels of signals received at antennas A11 and A12, respectively, are compared to each other by reception level comparing apparatus 13, and the comparison result is provided to antenna select switch control apparatus 12b. Control apparatus 12b controls switch 19 to select the antenna output with higher reception level.

The reception signal from the selected one antenna is provided to demodulator circuit 16 via switch 11 and demodulated. The signal thus demodulated is provided to a speaker or the like, which is not shown, to be played back.

The demodulated signal is provided to reception operation indicating signal analyzing apparatus 12a. Reception operation indicating signal analyzing apparatus 12a extracts a terminal reception operation indicating signal (bit) that is added to a downlink signal in a manner included in the frame formats of FIGS. 2–4 by terminal reception operation indicating signal adding apparatus 130 of the base station of FIG. 8, and analyzes the indication contents. Antenna select switch controlling apparatus 12b receives the analyzed result, and from that point onward, performs the reception operation based on the indication.

Next, the terminal shown in FIG. 11 can selectively address the diversity reception and the adaptive array reception.

Referring to FIG. 11, the inside of DSP 14 indicated by a broken line indicates the processes realized with software by DSP in functional blocks, and configured with a reception operation indicating signal analyzing apparatus 14a and an adaptive array reception and diversity reception addressing transmission/reception apparatus 14b.

A plurality of antennas (for example, two antennas in the example of FIG. 9) A11 and A12 are connected to adaptive array reception and diversity reception addressing transmission/reception apparatus 14b and provided to reception level comparing apparatus 13.

In reception, the reception levels of signals received at antennas A11 and A12, respectively, are compared to each other by reception level comparing apparatus 13, and the comparison result is output. The output of the reception level comparing apparatus 13 is also provided to adaptive array reception and diversity reception addressing transmission/reception apparatus 14b. The comparison result is used, for example, as the standard for antenna selection when the terminal performs the selective diversity reception.

The terminal shown in FIG. 11 is at least capable of selectively performing the diversity reception and the adaptive array reception using a plurality of antennas. Specifically, the diversity reception and the adaptive array reception are assumed to be performed selectively with software by adaptive array reception and diversity reception addressing transmission/reception apparatus 14b. Additionally, it is assumed that a reception in which a specific antenna is selected and the diversity reception and the adaptive array reception are not used is also selectively performed by transmission/reception apparatus 14b.

It should be noted that, as mentioned above, the operations of the diversity reception and the adaptive array reception are well known and may easily be realized selectively using DSP (software).

First, in transmission, a signal from a signal source such as a microphone, which is not shown, is modulated by modulator circuit 15 and transmitted using at least one of antennas A11 and A12 by a transmission method selected by adaptive array reception and diversity reception addressing transmission/reception apparatus 14b.

In reception, based on the outputs of antennas A11 and A12, and reception level comparing circuit 13, the adaptive array reception, the diversity reception, or the reception by a specific antenna is selectively performed by adaptive array reception and diversity reception addressing transmission/reception apparatus 14b.

The signal received by adaptive array reception and diversity reception addressing transmission/reception apparatus 14b is demodulated by demodulator circuit 16, and provided to, for example, a speaker or the like, which is not shown, and played back.

Further, the output of demodulator circuit 16 is provided to reception operation indicating signal analyzing apparatus 14a of DSP 14. Reception operation indicating signal analyzing apparatus 14a extracts the terminal reception operation indicating signal (bit) that is added to a downlink signal in a manner included in the frame formats of FIGS. 2–4 by terminal reception operation indicating signal adding apparatus 130 of FIG. 8, and analyzes the indication contents.

Adaptive array reception and diversity reception addressing transmission/reception apparatus 14b receives the analyzed result, and from that point onward, performs the reception operation based on the indication.

Figure 12:
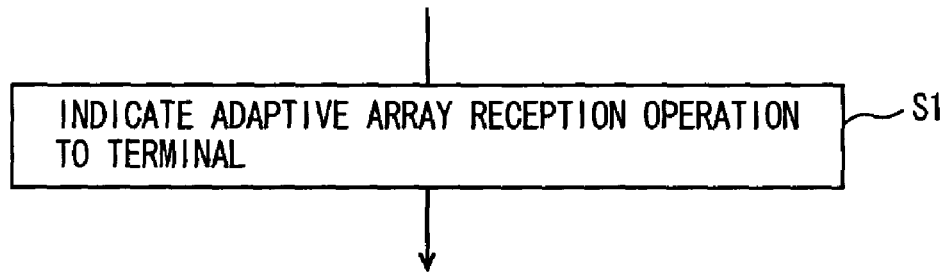
FIG. 12 is a flow chart showing an operation of a base station according to the first embodiment of the present invention.

Next, FIG. 12 is a flow chart showing an operation that is executed with software by DSP constituting the base station shown in FIG. 8 (in special, the operation of terminal reception operation indicating signal adding apparatus 130).

More specifically, FIG. 12 shows the indicating operation performed by the base station (terminal reception operation indicating signal adding apparatus 130) to the terminal requesting connection, when the base station is the adaptive array base station that performs the downlink transmission directivity control by the adaptive array process as shown in FIG. 8.

Specifically, referring to FIG. 12, when the base station performs the downlink transmission directivity control like the adaptive array base station, the base station indicates the adaptive array reception operation to the terminal requesting connection (step S1).

Figure 13:
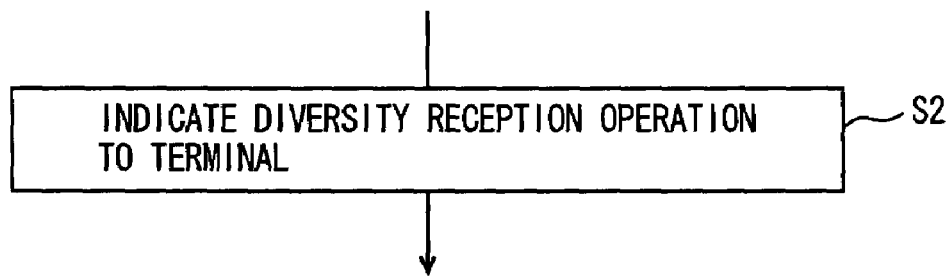
FIG. 13 is a flow chart showing an operation of another base station according to the first embodiment of the present invention.

On the other hand, the base station that does not perform the downlink transmission directivity control like the adaptive array base station, i.e., a so-called nondirectional base station, performs the reception operation indication to the terminal requesting connection as shown in the flow chart of FIG. 13.

Specifically, referring to FIG. 13, when the base station does not perform the downlink transmission directivity control, the base station specifies the diversity reception operation to the terminal requesting connection (step S2).

Next, FIGS. 14–17 are flow charts showing the operations performed by the terminals shown in FIGS. 9–11.

Figure 14:
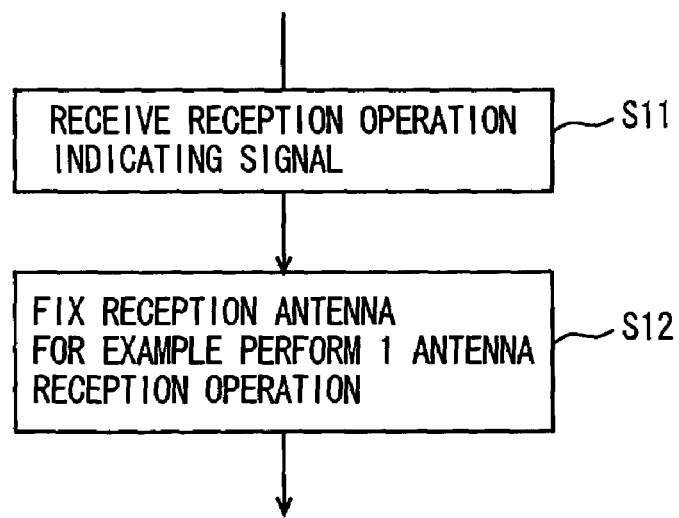
FIG. 14 is a flow chart showing an operation of a terminal according to the first embodiment of the present invention.

FIG. 14 is a flow chart showing the operation of the terminal of the type performing transmission/reception with one antenna as shown in FIG. 9 receiving a downlink signal from various base stations.

First, when the terminal receives an operation indicating signal (the indication of the adaptive array reception operation shown at step S1 in FIG. 12) from the adaptive array base station that performs the downlink transmission directivity control as shown in FIG. 8 (step S11 ), the terminal performs the reception operation that is fixed to that one antenna, since it is impossible to perform the adaptive array reception with one antenna (step S12).

On the other hand, when the terminal receives an operation indicating signal (the indication of the diversity reception operation shown at step S2 in FIG. 13) from a nondirectional base station that does not perform the downlink transmission directivity control, which is not shown (step S11), the terminal performs the reception operation fixed to the one antenna, since it is impossible to perform the diversity reception with one antenna (step S12).

Figure 15:
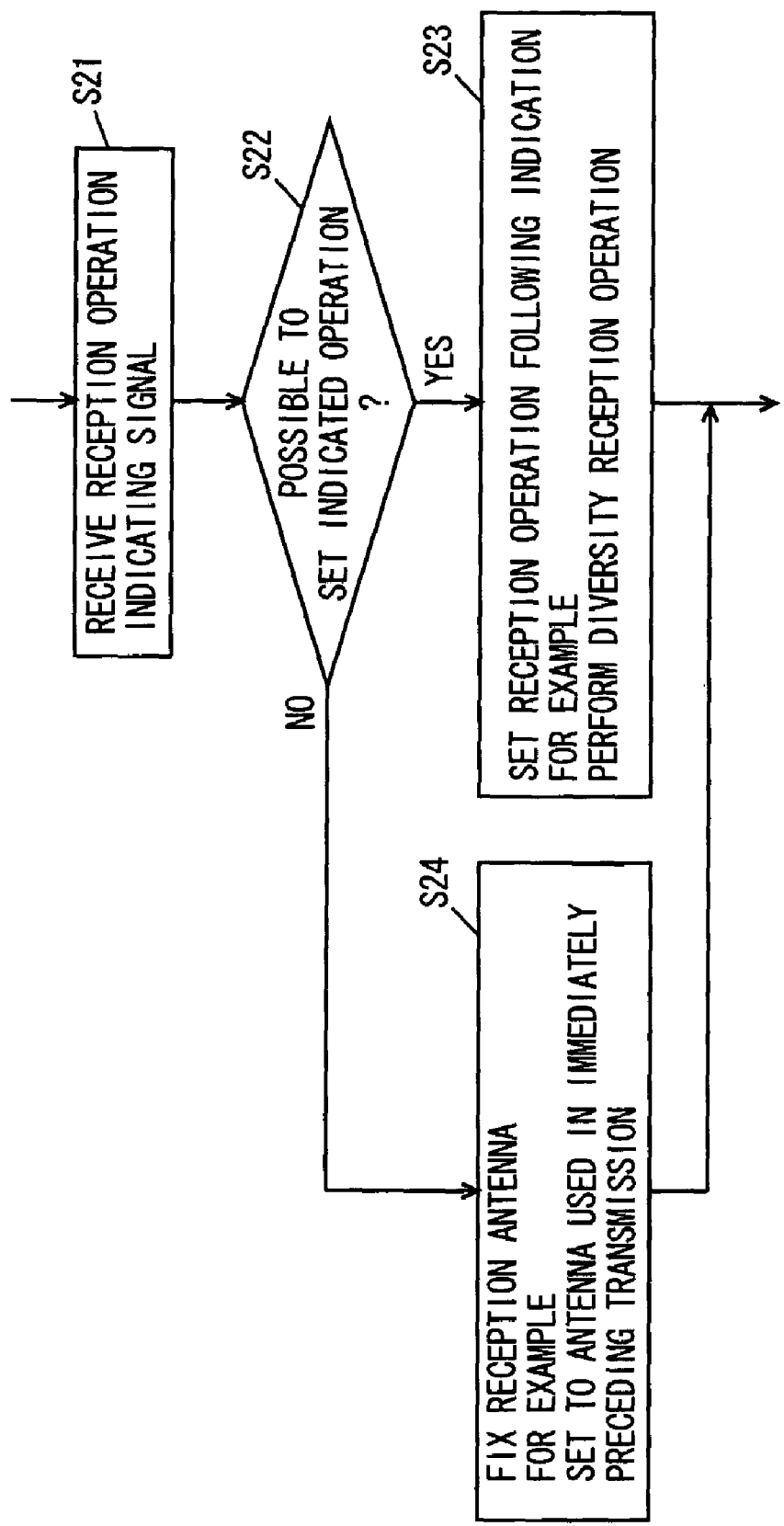
FIG. 15 is a flow chart showing an operation of another terminal according to the first embodiment of the present invention.

Next, FIG. 15 is a flow chart showing the operation by software when DSP 12 shown in FIG. 10 of a terminal performing the diversity reception with two antennas but not addressing the adaptive array, which is not shown, receives a downlink signal from various base stations.

First, when the terminal receives an operation indicating signal (the indication of adaptive array reception operation shown at step S1 in FIG. 12) from an adaptive array base station that performs the downlink transmission directivity control such as the one shown in FIG. 8 (step S21), since the terminal is determined not to be capable of setting the adaptive array reception (step S22), the terminal performs the reception operation in which the antenna that was used in the immediately preceding transmission is fixed as the reception antenna, as has been described with reference to FIG. 1 (step S24).

Thus, though the diversity terminal still can not attain the adaptive array reception that has better characteristics, it can attain the antenna control addressing the downlink transmission directivity control. Hence, degradation of the reception performance of the terminal when connected to the adaptive array base station can be prevented.

On the other hand, when the diversity terminal receives an operation indicating signal (the indication of the diversity reception operation shown at step S2 in FIG. 13) from a nondirectional base station that does not perform the downlink transmission directivity control, which is not shown (step S21), since the terminal is determined to be capable of setting diversity reception (step S22), it follows the reception operation indication and performs the diversity reception operation (step S23).

Figure 16:
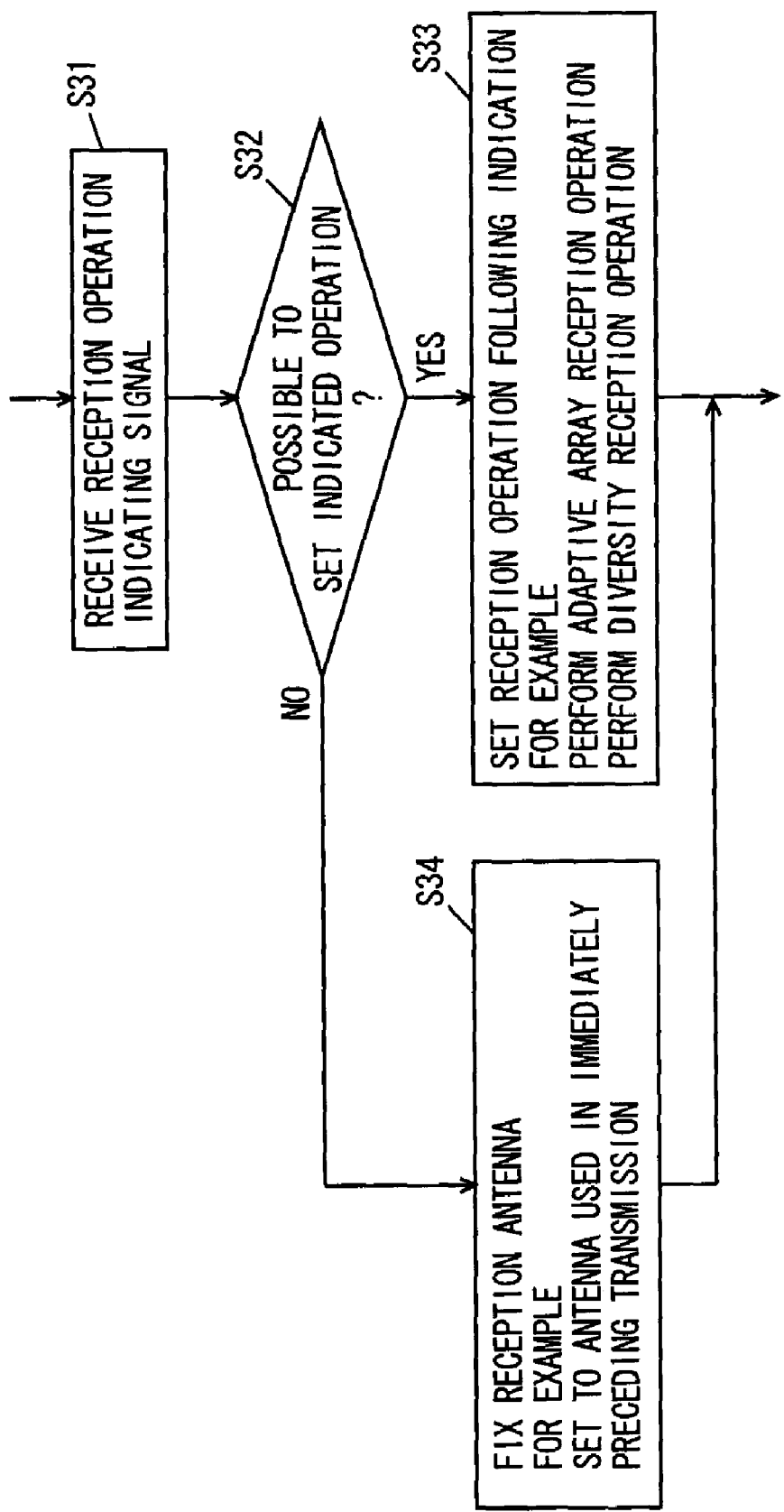
FIG. 16 is a flow chart showing an operation of still another terminal according to the first embodiment of the present invention.

Next, FIG. 16 is a flow chart showing the operation of the terminal capable of addressing the adaptive array reception shown in FIG. 11 when it receives a downlink signal from various base stations.

First, when the terminal receives an operation indicating signal (the indication of the adaptive array reception operation shown at step S1 in FIG. 12) from an adaptive array base station that performs the downlink transmission directivity control such as the one shown in FIG. 8 (step S31), since the terminal is determined to be capable of setting the adaptive array reception (step S32), the terminal follows the reception operation indication and performs the adaptive array reception operation (step S33).

Thus, the terminal performs the adaptive array reception that removes undesired interference waves to prevent degradation of the reception performance of the terminal when it is connected to the adaptive array base station.

On the other hand, when the terminal receives an operation indicating signal (the indication of the diversity reception operation shown at step S2 in FIG. 13) from a nondirectional base station that does not perform the downlink transmission directivity control, which is not shown (step S31), since the terminal is determined to be capable of setting diversity reception (step S32), it follows the reception operation indication and performs the diversity reception operation (step S33).

It is noted that, when the terminal receives any reception operation indicating signal indicating other than the adaptive array reception and the diversity reception (step S31), since the terminal is not capable of setting such a reception operation (step S32), in this example the terminal performs the reception operation described above referring to FIG. 1 in which the antenna used in the immediately preceding transmission is fixed as the reception antenna (step S34).

Thus, the terminal becomes capable of the antenna control addressing the downlink transmission directivity control, preventing degradation of the reception performance of the terminal when it is connected to the adaptive array base station.

Figure 17:
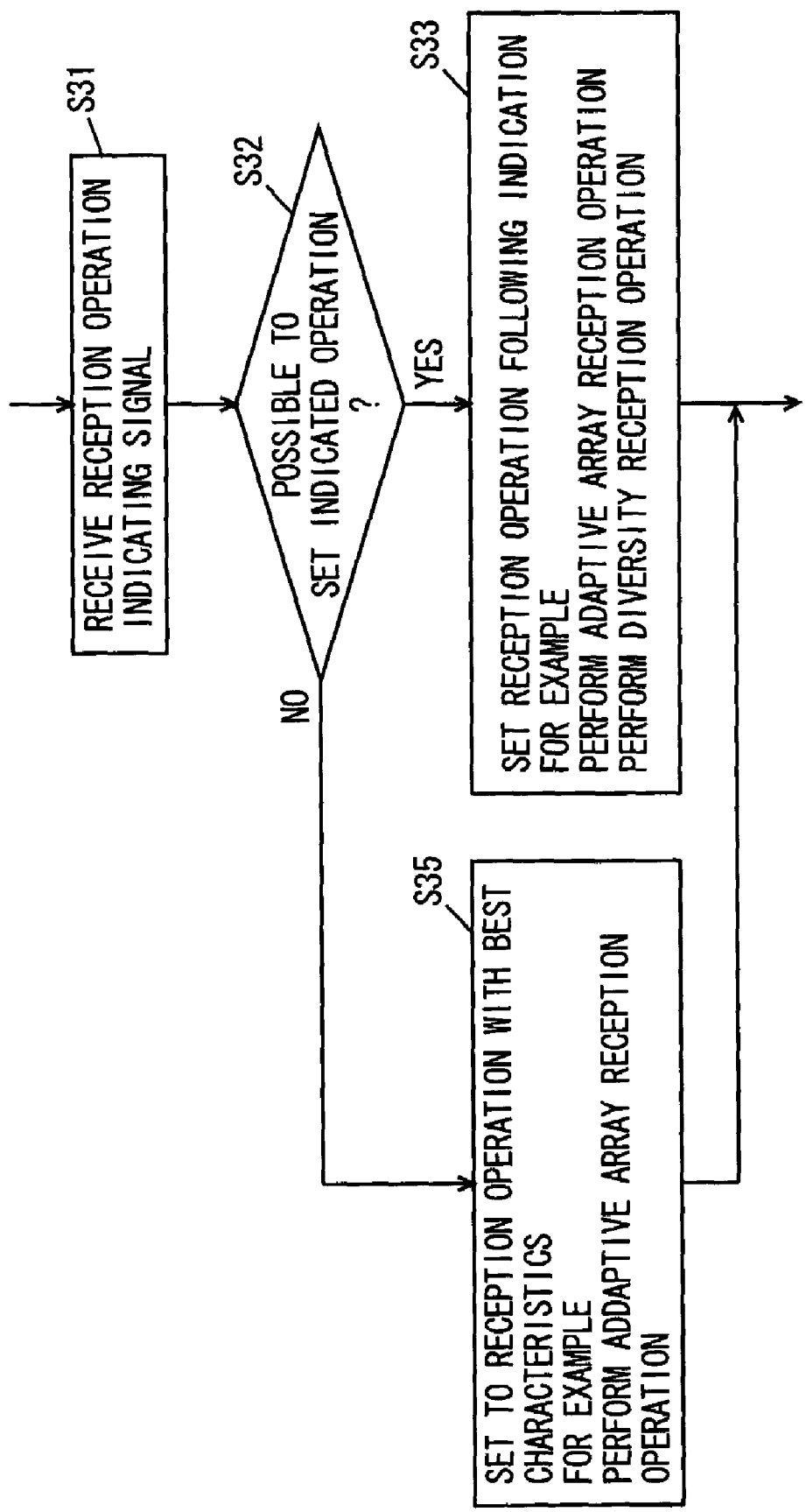
FIG. 17 is a flow chart showing an operation of still another terminal according to the first embodiment of the present invention.

Further, the flow chart of FIG. 17 is basically identical to the flow chart of FIG. 16, except for the operation of the terminal when it receives an reception operation indicating signal indicating other than the adaptive array reception and the diversity reception from any base station, as described above.

Specifically, though in the example shown in FIG. 16, the terminal performs control of fixing the antenna used in the immediately preceding transmission as the reception antenna (step S34), in the example shown in FIG. 17, it is configured to perform the adaptive array reception in such a case (step S35).

Thus, the terminal can prevent degradation of the reception performance of the terminal when it is connected to any base station, by the adaptive array reception that is the reception operation with the best characteristics.

Figure 27A:
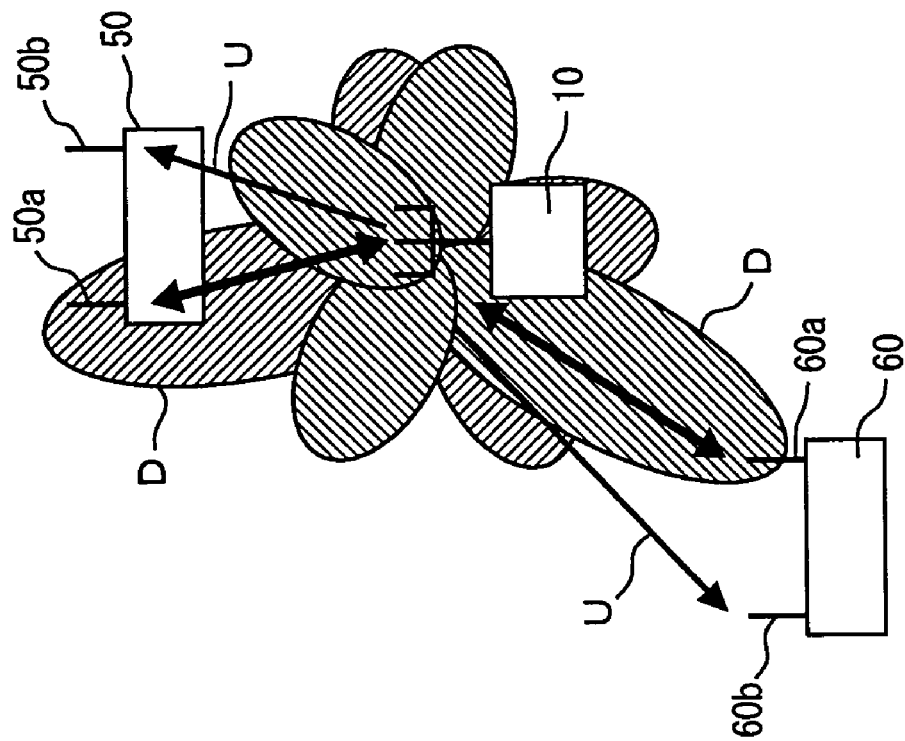
FIGS. 27A and 27B schematically shows another example of a connection states of conventional terminals and base stations.
Figure 27B:
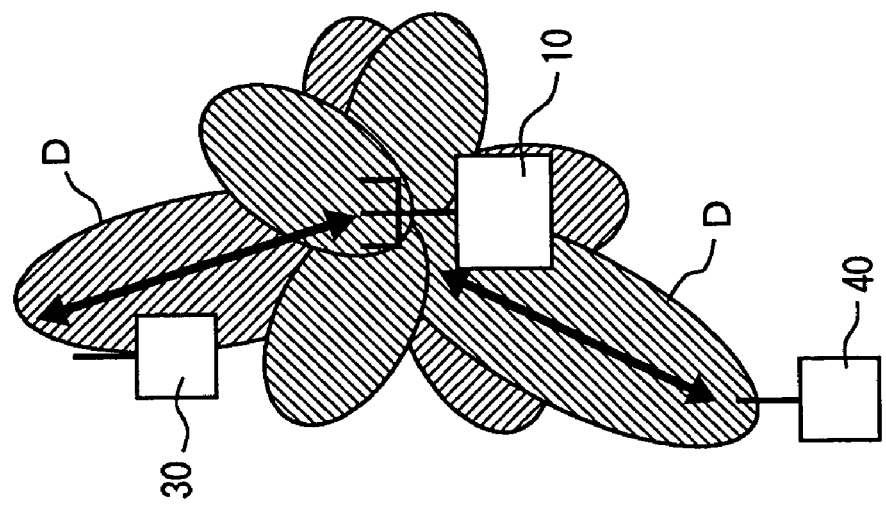

It is noted that, as described with reference to FIGS. 27A and 27B, even when the adaptive array base station is a spatial multiplexing base station that uses the adaptive array technique and connecting with a plurality of terminals in the spatial multiplexing manner, the process of the first embodiment described above can be applied.

As above, according to the first embodiment of the present invention, the reception operation at the terminal is configured to be indicated depending on whether the base station desired by the terminal to connect to is the adaptive array base station (or the spatial multiplexing base station) that performs the downlink transmission directivity control or not, and the terminal is configured to automatically select the optimum reception operation in response to the indication from the base station. Accordingly, the improvements of DU ratio and the reception performance at the terminal can be attained.

Second Embodiment

Figure 18:
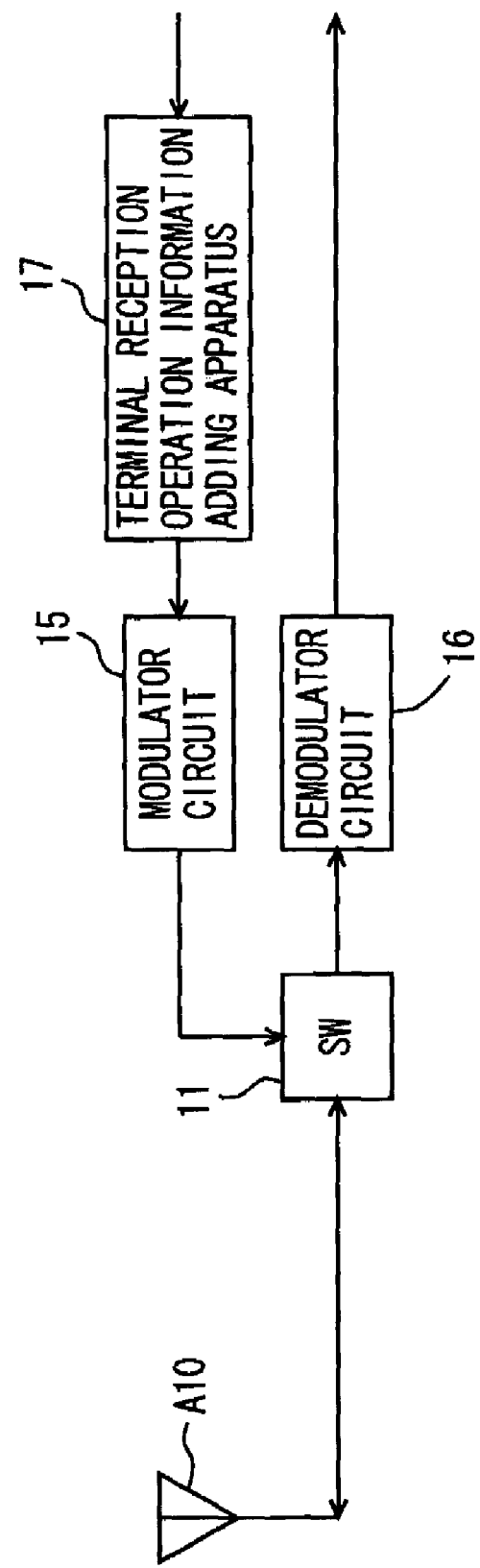
FIG. 18 is a functional block diagram showing a system configuration of a terminal according to a second embodiment of the present invention.
Figure 19:
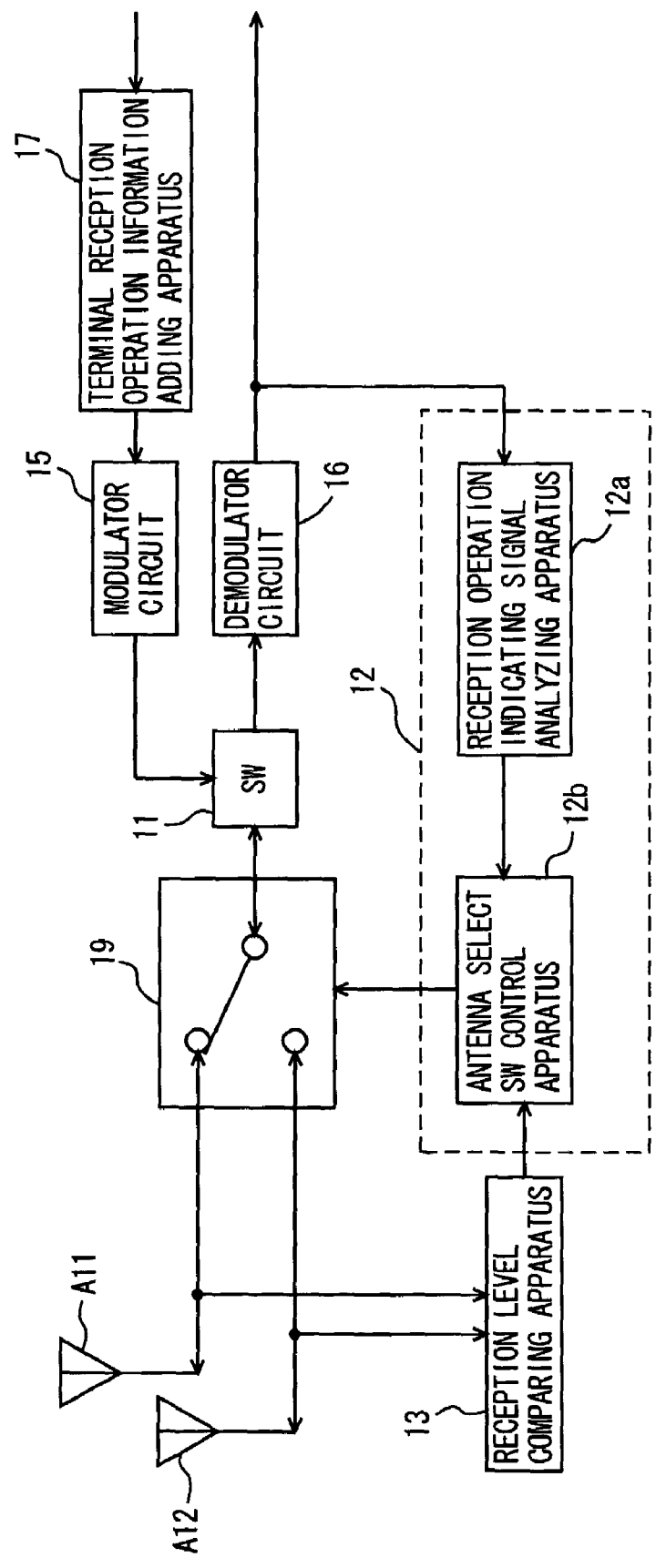
FIG. 19 is a functional block diagram showing a system configuration of another terminal according to the second embodiment of the present invention.
Figure 20:
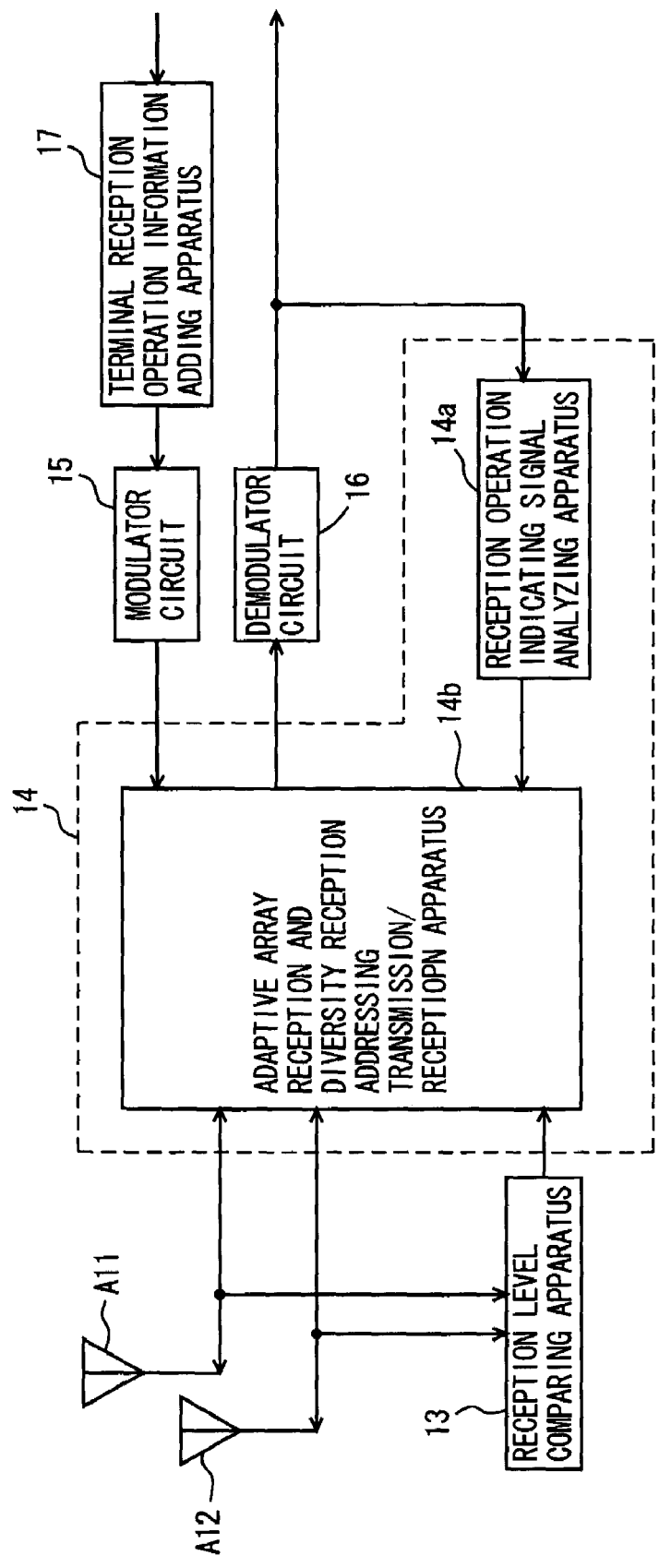
FIG. 20 is a functional block diagram showing a system configuration of still another terminal according to the second embodiment of the present invention.

Next, FIGS. 18–20 are functional block diagrams showing system configuration of terminals according to a second embodiment of the present invention for realizing the operation principle of the present invention.

The configurations of terminals shown in FIGS. 18–20 are identical to those of the terminals according to the first embodiment shown in FIGS. 9–11 except for the following point.

Specifically, further to the terminals shown in FIGS. 9–11, the terminals of FIGS. 18–20 are each provided with a terminal reception information adding apparatus 17 in the front stage of the modulator circuit. Terminal reception information adding apparatus 17 adds information related to the reception operation that the terminal addresses to an uplink signal transmitted to the base station.

The reception operation information is, for example in the timing diagrams of FIGS. 5–7, inserted at any location in any uplink signal frame at the timing preceding to each timing where the reception operation indicating signal (bit) is transmitted from the base station to the terminal, and transmitted from the terminal to the desired base station to connect to.

The other operations of those terminals are identical to those described with reference to FIGS. 9–11.

Figure 21:
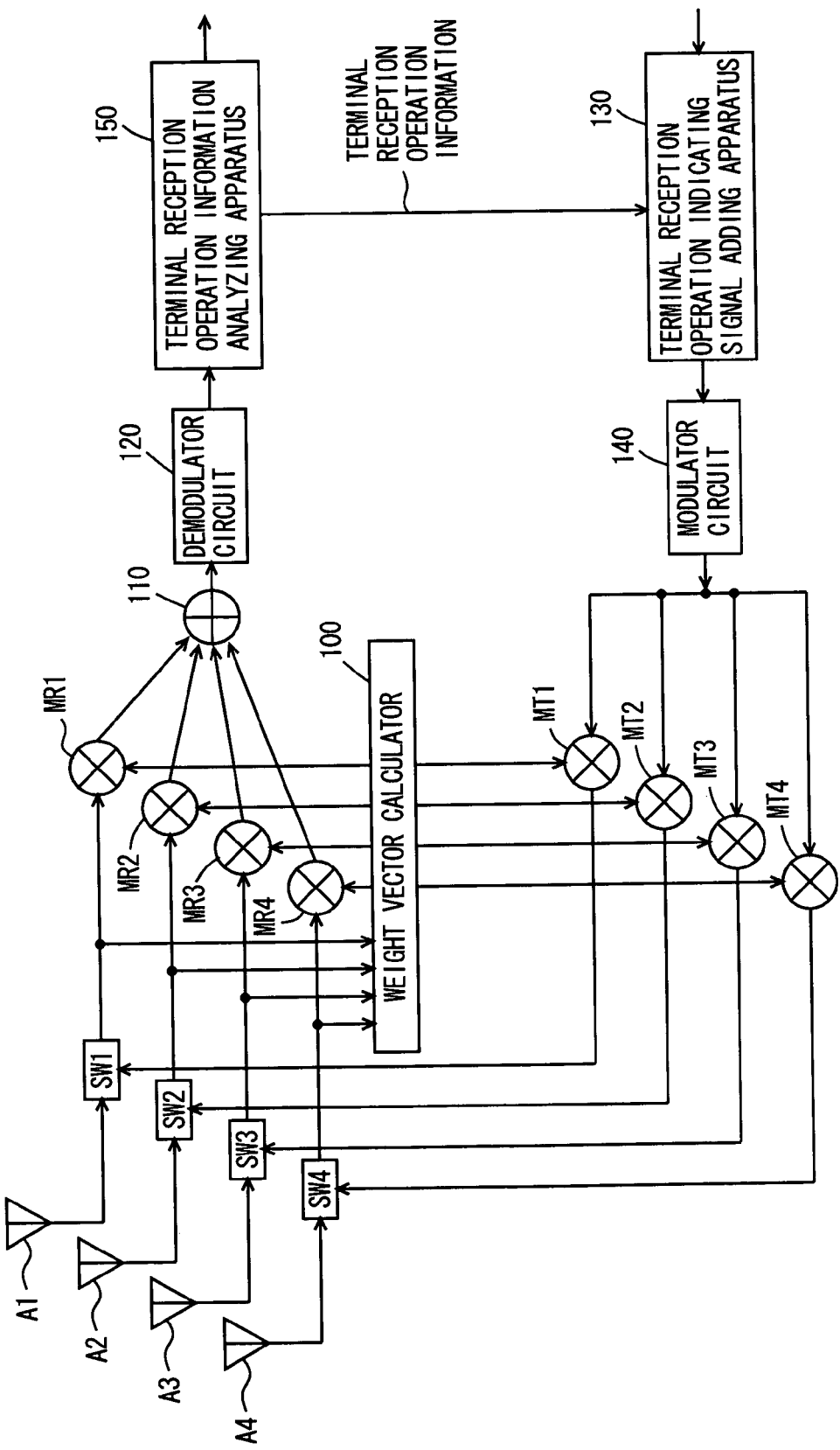
FIG. 21 is a functional block diagram showing a system configuration of a base station according to the second embodiment of the present invention.

Next, FIG. 21 is a functional block diagram showing a system configuration of a base station according to the second embodiment of the present invention for realizing the operation principle of the present invention. The base station shown in FIG. 21 is identical to the base station according to the first embodiment shown in FIG. 8 except for the following point.

Specifically, further to the base station shown in FIG. 8, the base station of FIG. 21 is provided with a terminal reception operation information analyzing apparatus 150 in the subsequent stage of demodulator circuit 120. When the terminal having the configuration of FIGS. 18–20 attempts to connect to the base station, terminal reception operation information analyzing apparatus 150 analyses the terminal operation information transmitted as added to an uplink transmission signal at terminal reception operation information adding apparatus 17 of such a terminal, and provides thus extracted terminal reception operation information to terminal reception operation indicating signal adding apparatus 130. Based on the terminal reception operation information, terminal reception operation indicating signal adding apparatus 130 adds a signal indicating the reception operation that is adapted to the transmission operation of the base station to a downlink signal transmitted to the terminal.

Figure 22:
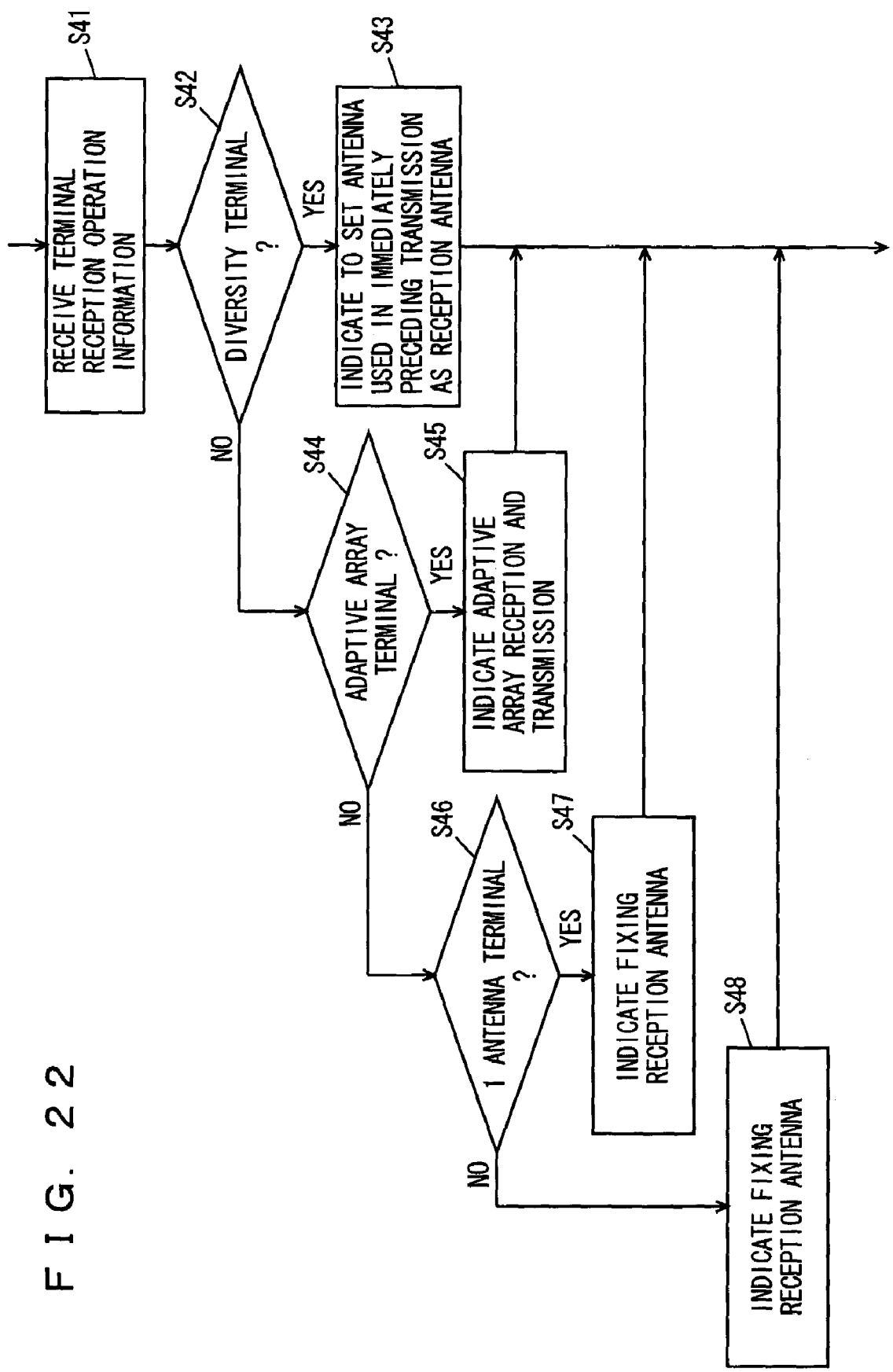
FIG. 22 is a flow chart showing an operation of a base station according to the second embodiment of the present invention.

Next, FIG. 22 is a flow chart showing an operation performed with software by DSP constituting the base station shown in FIG. 21 (in special, the operations of terminal reception operation information analyzing apparatus 150 and terminal reception operation indicating signal adding apparatus 130).

In more detail, FIG. 22 shows the indication operation performed by a base station (terminal reception operation information analyzing apparatus 150 and terminal reception operation indicating signal adding apparatus 130) to a terminal requesting connection, when the base station is the adaptive array base station that performs the downlink transmission directivity control by the adaptive array process, as shown in FIG. 21.

Specifically, referring to FIG. 22, when the base station performs the down link transmission directivity control like the adaptive array base station, the base station firstly receives terminal reception operation information transmitted from terminal reception operation information adding apparatus 17 of the terminal requesting connection at terminal reception operation information analyzing apparatus 150, and specifies the reception operation of the terminal (step S41).

Figure 26A:
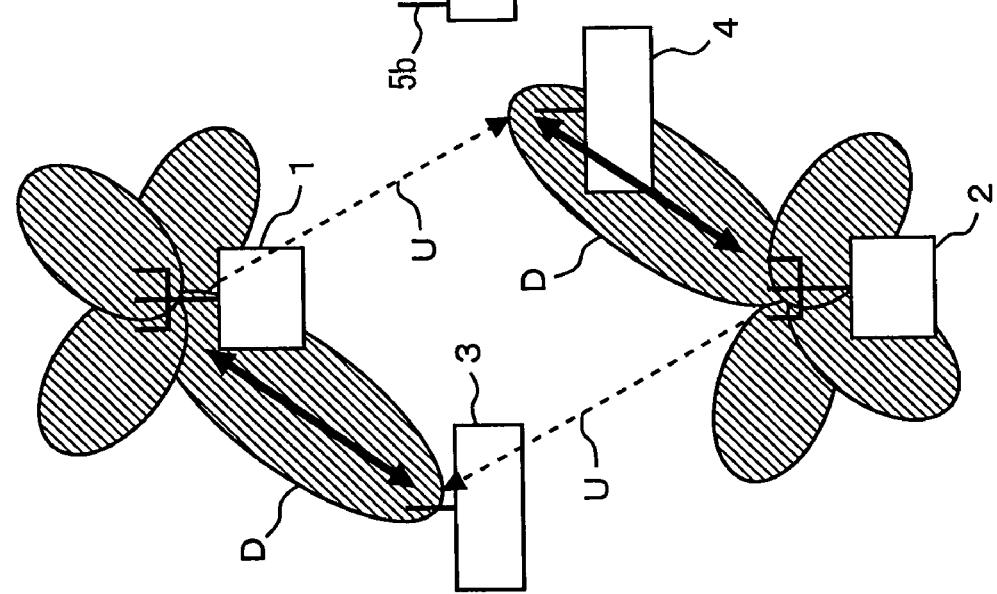

Then, it is determined whether the terminal attempting connection is the diversity terminal as shown in FIG. 19 or not (step S42), and when it is determined to be the diversity terminal, since the characteristics of the terminal degrades with the adaptive array base station as described with reference to FIGS. 26A and 26B, it generates a signal indicating to set the transmission antenna of the immediately preceding frame as the reception antenna such as the one described with reference to FIG. 1 (step S43), and inserts it to a downlink transmission signal by the terminal reception operation indicating signal adding apparatus 130.

On the other hand, when the terminal is determined not to be the diversity terminal at step S42, then subsequently it is determined if the terminal is an adaptive array terminal such as the one shown in FIG. 20 (step S44).

When it is determined to be the adaptive array terminal, then it generates a signal indicating the adaptive array reception to the terminal (step S45), and inserts it to a downlink transmission signal by terminal reception operation indicating signal adding apparatus 130.

On the other hand, when the terminal is determined not to be the adaptive array terminal at step S44, then subsequently it is determined if the terminal is the terminal with one antenna such as the one shown in FIG. 18 (step S46).

When it is determined to be the one antenna terminal, then it generates a signal that indicates to fix the one antenna as the reception antenna (step S47), and inserts it to a downlink transmission signal by terminal reception operation indicating signal adding apparatus 130.

On the other hand, when it is determined that the terminal is not the one antenna terminal (step S46), it generates a signal that indicates to fix a specific antenna of the terminal as the reception antenna temporarily (step S48), and inserts it to a downlink transmission signal by terminal reception operation indicating signal adding apparatus 130.

Figure 23:
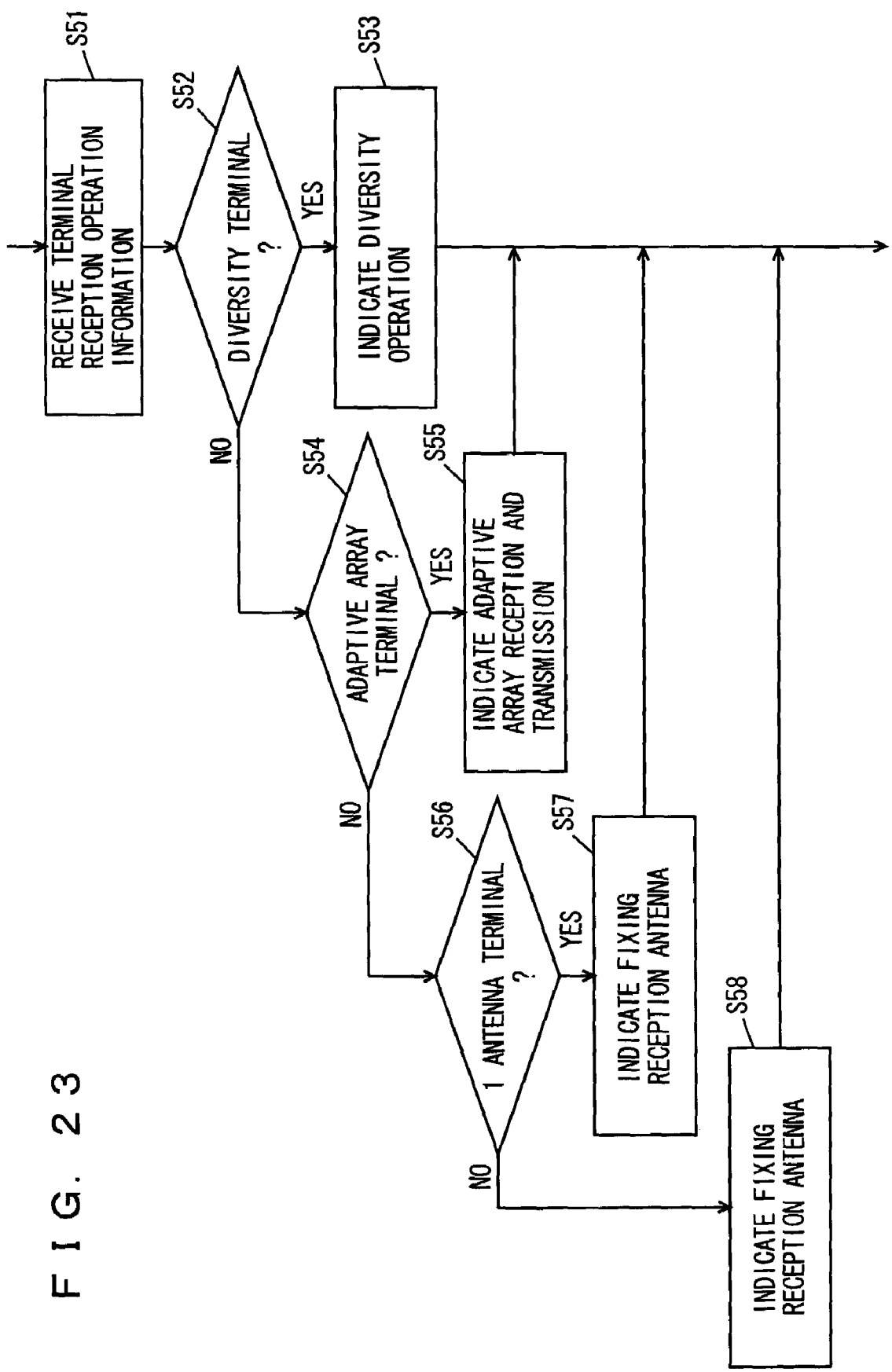
FIG. 23 is a flow chart showing an operation of another base station according to the second embodiment of the present invention.

The base station that does not perform the downlink transmission directivity such as the adaptive array base station of FIG. 21, i.e., a so-called nondirectional base station, which is not shown, performs the reception operation indication shown in the flow chart of FIG. 23 to the terminal requesting connection.

When the terminal attempting connection is determined whether it is the diversity terminal shown in FIG. 19 or not (step S52), and when it is determined to be the diversity terminal, the base station generates a signal indicating the diversity reception (step S53) and inserts it to a downlink transmission signal.

On the other hand, when the terminal is determined not to be the diversity terminal at step S52, then the terminal is determined whether it is the adaptive array terminal such as the one shown in FIG. 20 (step S54).

When the terminal is determined to be the adaptive array terminal, the base station generates a signal indicating the adaptive array reception to the terminal (step S55), and inserts it to a downlink transmission signal.

On the other hand, when the terminal is determined not to be the adaptive array terminal, then the terminal is determined whether it is the one antenna terminal such as the one shown in FIG. 18 or not (step S56).

When the terminal is determined to be the one antenna terminal, then the base station generates a signal that indicates to fix the one antenna as the reception antenna (step S57), and inserts it to a downlink transmission signal.

On the other hand, when the terminal is determined not to be the one antenna terminal (step S56), the base station generates a signal that indicates to fix a specific antenna of the terminal as the reception antenna temporarily (step S58), and inserts it to a downlink transmission signal.

Figure 24:
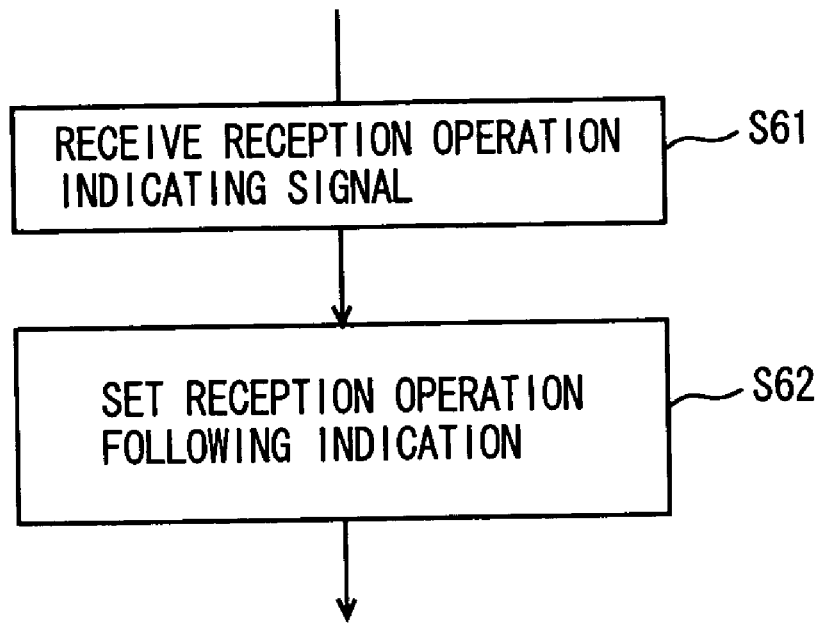
FIG. 24 is a flow chart showing an operation of a terminal according to the second embodiment of the present invention.

Next, FIG. 24 is a flow chart showing the operation of the diversity terminal such as the one shown in FIG. 19 and the adaptive array terminal such as the one shown in FIG. 20 (in special, the reception operation indicating signal analyzing apparatus thereof) when they receive reception operation indicating signals from various base stations shown in FIGS. 22 and 23.

Referring to FIG. 24, when a reception operation indicating signal is received and extracted from a corresponding terminal (step S61), following the indication contents (steps S43 and S45 in FIG. 22, and steps S53 and S55 in FIG. 23), the terminal is set to perform the indicated reception operation.

Figure 25:
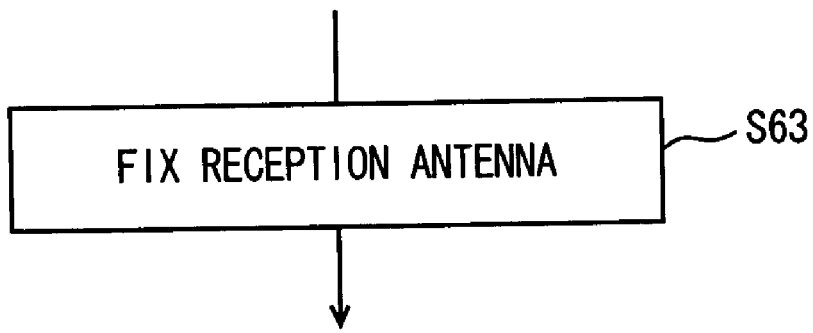
FIG. 25 is a flow chart showing an operation of another terminal according to the second embodiment of the present invention.

Next, FIG. 25 is a flow chart showing an operation of the one antenna terminal such as the one shown in FIG. 18 when it receives reception operation indicating signals from various base stations shown in FIGS. 22 and 23.

Specifically, at the above described step S47 in FIG. 22 and step S57 in FIG. 23, the one antenna terminal is indicated to fix the reception antenna. The one antenna terminal of FIG. 18 inherently performs transmission/reception with one antenna, and for the indication also, the reception operation fixing to one antenna is performed (Step S60).

It is noted that, as described with reference to FIGS. 27A and 27B, even when the adaptive array base station is a spatial multiplexing base station that uses the adaptive array technique and connecting with a plurality of terminals in the spatial multiplexing manner, the process of the second embodiment described above can be applied.

As above, According to the second embodiment of the present invention, the base station is configured to specify the optimum reception operation of the corresponding terminal based on the terminal operation information received from the terminal. Accordingly, DU ratio and the reception characteristics at the terminal can be improved.

It should be noted that, in description of each of the embodiments above, the adaptive array base station performing the spatial multiplexing connection by the adaptive array process is used as a spatial multiplexing base station to which a plurality of terminals are connected, it is not limited to the adaptive array process. The present invention is applicable to any base station using any process technique, as long as it allows the spatial multiplexing connection with the downlink directivity control.

As above, according to the present invention, by the terminal automatically selecting its reception operation in response to a terminal reception operation indicating signal from the base station to connect to, the optimum reception method addressing the transmission operation type of the base station (whether it is the base station performing the downlink transmission directivity control or not) can be realized, thus preventing degradation of the reception performance at the terminal.

Further, according to the present invention, by the terminal automatically selecting its reception operation in response to a terminal reception operation indicating signal that takes in account of the terminal operation information from the base station to connect to, the optimum reception method that more precisely addresses the transmission operation type of the base station (whether it is the base station performing the downlink transmission directivity control or not) can be realized, thus preventing degradation of the reception performance at the terminal.

INDUSTRIAL APPLICABILITY

According to the present invention, since the terminal is configured to select its reception operation automatically in response to the indicating signal from the base station, it is effective in improving the reception performance of the terminal.

The invention claimed is:

1. A radio base station apparatus to which a radio terminal apparatus can connect, said radio base station apparatus performing a transmission operation with transmission directivity to said radio terminal apparatus, comprising:
   reception means for accepting a connection request from said radio terminal apparatus; and
   transmission means for transmitting to said radio terminal apparatus a signal indicating a reception operation adapted to a transmission operation of said radio base station apparatus in response to said connection request, wherein
   said transmission means transmit to said radio terminal apparatus a signal indicating an adaptive array reception operation constantly, even when a radio wave environment between the radio base station apparatus and said radio terminal apparatus changes.

2. A radio base station apparatus to which a radio terminal apparatus can connect, said radio base station apparatus performing a transmission operation without transmission directivity to said radio terminal apparatus, comprising:
   reception means for accepting a connection request from said radio terminal apparatus; and
   transmission means for transmitting to said radio terminal apparatus a signal indicating a reception operation adapted to the transmission operation of said radio base station apparatus in response to said connection request, wherein
   said transmission means transmit to said radio terminal apparatus a signal indicating a diversity reception operation constantly, even when a radio wave environment between the radio base station apparatus and said radio terminal apparatus changes.

3. A radio terminal apparatus that can connect to a radio base station apparatus, said radio base station apparatus to be connected performing a transmission operation with transmission directivity to said radio terminal apparatus, said radio base station apparatus including transmission means for transmitting to said radio terminal apparatus a signal indicating a reception operation adapted to a transmission operation of said radio base station apparatus in response to a connection request from said radio terminal apparatus, and said transmission means transmitting to said radio terminal apparatus a signal indicating an adaptive array reception operation constantly, even when a radio wave environment between the radio base station apparatus and said radio terminal apparatus changes, said radio terminal apparatus comprising:

means for performing a connection request to said radio base station apparatus to connect to;

means for receiving said signal indicating the reception operation transmitted from said radio base station apparatus in response to said connection request;

means for determining whether the reception operation indicated by said received signal is possible to be performed or not; and reception operation control means for performing said indicated reception operation when said indicated reception operation is determined possible to be performed, and for performing a prescribed reception operation when said indicated reception operation is determined impossible to be performed.

4. The radio terminal apparatus according to claim 3, wherein said radio terminal apparatus is a radio terminal apparatus performing transmission and reception with one antenna, and said reception operation control means perform a reception operation with said one antenna in response to said signal indicating the adaptive array reception operation.

5. The radio terminal apparatus according to claim 3, wherein said radio terminal apparatus is a radio terminal apparatus that can perform diversity reception with a plurality of antennas, and said reception operation control means perform a reception operation in which a reception diversity operation selecting an antenna with a higher reception level among said plurality of antennas and performing reception is stopped, and an antenna used for a signal transmission to the radio base station apparatus among said plurality of antennas is used for an immediately following reception operation from the radio base station apparatus in response to said signal indicating the adaptive array reception operation.

6. The radio terminal apparatus according to claim 3, wherein said radio terminal apparatus is a radio terminal apparatus that can perform the adaptive array reception with a plurality of antennas, and said reception operation control means perform the adaptive array reception operation in response to said signal indicating the adaptive array reception operation.

7. The radio terminal apparatus according to claim 6, wherein said prescribed reception operation that is performed when said indicated reception operation is determined impossible to be performed is a reception operation in which a reception diversity operation selecting an antenna with a higher reception level among said plurality of antennas and performing reception is stopped, and an antenna used for a signal transmission to the radio base station apparatus among said plurality of antennas is used for an immediately following reception operation from the radio base station apparatus.

8. The radio terminal apparatus according to claim 6, wherein said prescribed reception operation that is performed when said indicated reception operation is determined impossible to be performed is the adaptive array reception operation.

9. A radio terminal apparatus that can connect to a radio base station apparatus, said radio base station apparatus to be connected performing a transmission operation without transmission directivity to said radio terminal apparatus, said radio base station apparatus including transmission means for transmitting to said radio terminal apparatus a signal indicating a reception operation adapted to the transmission operation of said radio base station apparatus in response to a connection request from said radio terminal apparatus, and said transmission means transmitting to said radio terminal apparatus a signal indicating a diversity reception operation constantly, even when a radio wave environment between the radio base station apparatus and said radio terminal apparatus changes, said radio terminal apparatus comprising:

means for performing a connection request to said radio base station apparatus to connect to;

means for receiving a signal indicating said reception operation transmitted from said radio base station apparatus in response to said connection request;

means for determining whether the reception operation indicated by said received signal is possible to be performed or not; and reception operation control means for performing said indicated reception operation when said indicated reception operation is determined possible to be performed, and for performing a prescribed reception operation when said indicated reception is determined impossible to be performed.

10. The radio terminal apparatus according to claim 9, wherein said radio terminal apparatus is a radio terminal apparatus performing transmission and reception with one antenna, and said reception operation control means perform a reception operation with said one antenna in response to said signal indicating the diversity reception operation.

11. The radio terminal apparatus according to claim 9, wherein said radio terminal apparatus is a radio terminal apparatus that can perform diversity reception with a plurality of antennas, and said reception operation control means perform the diversity reception operation in response to said signal indicating the diversity reception operation.

12. The radio terminal apparatus according to claim 9, wherein said radio terminal apparatus is a radio terminal apparatus that can perform adaptive array reception with a plurality of antennas, and said reception operation control means perform the diversity reception operation in response to said signal indicating the diversity reception operation.

13. A mobile communication system comprising a radio base station apparatus and a radio terminal apparatus, wherein said radio base station apparatus performs a transmission operation with transmission directivity to said radio terminal apparatus, and includes reception means for accepting a connection request from said radio terminal apparatus; and transmission means for transmitting to said radio terminal apparatus a signal indicating a reception operation adapted to a transmission operation of said radio base station apparatus in response to said connection request, said transmission means transmitting to said radio terminal apparatus a signal indicating an adaptive array reception operation constantly, even when a radio wave environment between the radio base station apparatus and said radio terminal apparatus changes, said radio terminal apparatus includes means for performing a connection request to said radio base station apparatus to connect to, means for receiving said signal indicating the reception operation transmitted from said radio base station apparatus in response to said connection request, means for determining whether the reception operation indicated by said received signal is possible to be performed or not, and reception operation control means for performing said indicated reception operation when said indicated reception operation is determined possible to be performed, and for performing a prescribed reception operation when said indicated reception operation is determined impossible to be performed.

14. The mobile communication system according to claim 13, wherein said radio terminal apparatus is a radio terminal apparatus performing transmission and reception with one antenna, and said reception operation control means perform a reception operation with said one antenna in response to said signal indicating the adaptive array reception operation.

15. The mobile communication system according to claim 13, wherein said radio terminal apparatus is a radio terminal apparatus that can perform diversity reception with a plurality of antennas, and said reception operation control means perform a reception operation in which a reception diversity operation selecting an antenna with a higher reception level among said plurality of antennas and performing reception is stopped, and an antenna used for a signal transmission to the radio base station apparatus among said plurality of antennas is used for an immediately following reception operation with the radio base station apparatus in response to said signal indicating the adaptive array reception operation.

16. The mobile communication system according to claim 13, wherein said radio terminal apparatus is a radio terminal apparatus that can perform the adaptive array reception with a plurality of antennas, and said reception operation control means perform the adaptive array reception operation in response to said signal indicating the adaptive array reception operation.

17. The mobile communication system according to claim 16, wherein said prescribed reception operation that is performed when said indicated reception operation is determined impossible to be performed is a reception operation in which a reception diversity operation selecting an antenna with a higher reception level among said plurality of antennas and performing reception is stopped, and an antenna used for a signal transmission to the radio base station apparatus among said plurality of antennas is used for an immediately following reception operation from the radio base station apparatus.

18. The mobile communication system according to claim 16, wherein said prescribed reception operation that is performed when said indicated reception operation is determined impossible to be performed is the adaptive array reception operation.

19. A mobile communication system comprising a radio base station apparatus and a radio terminal apparatus, wherein said radio base station apparatus performs a transmission operation without transmission directivity to said radio terminal apparatus, and includes reception means for accepting a connection request from said radio terminal apparatus; and transmission means for transmitting to said radio terminal apparatus a signal indicating a reception operation adapted to the transmission operation of said radio base station apparatus in response to said connection request, said transmission means transmitting to said radio terminal apparatus a signal indicating a diversity reception operation constantly, even when a radio wave environment between the radio base station apparatus and said radio terminal apparatus changes, said radio terminal apparatus includes means for performing a connection request to said radio base station apparatus to connect to, means for receiving said signal indicating the reception operation transmitted from said radio base station apparatus in response to said connection request, means for determining whether the reception operation indicated by said received signal is possible to be performed or not, and reception operation control means for performing said indicated reception operation when said indicated reception operation is determined possible to be performed, and for performing a prescribed reception operation when said indicated reception operation is determined impossible to be performed.

20. The mobile communication system according to claim 19, wherein said radio terminal apparatus is a radio terminal apparatus performing transmission and reception with one antenna, and said reception operation control means perform a reception operation with said one antenna in response to said signal indicating the diversity reception operation.

21. The mobile communication system according to claim 19, wherein said radio terminal apparatus is a radio terminal apparatus that can perform diversity reception with a plurality of antennas, and said reception operation control means perform the diversity reception operation in response to said signal indicating the diversity reception operation.

22. The mobile communication system according to claim 19, wherein said radio terminal apparatus is a radio terminal apparatus that can perform adaptive array reception with a plurality of antennas, and said reception operation control means perform the diversity reception operation in response to said signal indicating the diversity reception operation.

23. A reception operation control program for controlling, in a radio base station apparatus to which a radio terminal apparatus can connect, a reception operation of the radio terminal apparatus that is to connect to said radio base station apparatus, said radio base station apparatus performing a transmission operation with transmission directivity to said radio terminal apparatus, said program causing a computer to execute the steps of:
accepting a connection request from said radio terminal apparatus; and
transmitting to said radio terminal apparatus a signal indicating a reception operation adapted to a transmission operation of said radio base station apparatus in response to said connection request, wherein
said step of transmitting said signal indicating the reception operation includes a step of transmitting to said radio terminal apparatus a signal indicating an adaptive array reception operation constantly, even when a radio wave environment between the radio base station apparatus and said radio terminal apparatus changes.

24. A reception operation control program for controlling, in a radio base station apparatus to which a radio terminal apparatus can connect, a reception operation of the radio terminal apparatus that is to connect to said radio base station apparatus, said radio base station apparatus performing a transmission operation without transmission directivity to said radio terminal apparatus, said program causing a computer to execute the steps of:
accepting a connection request from said radio terminal apparatus; and
transmitting to said radio terminal apparatus a signal indicating a reception operation adapted to a transmission operation of said radio base station apparatus in response to said connection request, wherein
said step of transmitting said signal indicating the reception operation includes a step of transmitting to said radio terminal apparatus a signal indicating a diversity reception operation constantly, even when a radio wave environment between the radio base station apparatus and said radio terminal apparatus changes.

25. A reception operation control program for controlling a reception operation in a radio terminal apparatus that can connect to a radio base station apparatus, said radio base station apparatus to be connected performing a transmission operation with transmission directivity to said radio terminal apparatus, said radio base station apparatus including transmission means for transmitting to said radio terminal apparatus a signal indicating a reception operation adapted to a transmission operation of said radio base station apparatus in response to a connection request from said radio terminal apparatus, and said transmission means transmitting to said radio terminal apparatus a signal indicating an adaptive array reception operation constantly, even when a radio wave environment between the radio base station apparatus and said radio terminal apparatus changes, said reception operation control program causing a computer to execute the steps of:
performing a connection request to said radio base station apparatus to connect to;
receiving said signal indicating the reception operation transmitted from said radio base station apparatus in response to said connection request;
determining whether said reception operation indicated by said received signal is possible to be performed or not; and
performing the reception operation when said indicated reception operation is determined possible to be performed, and performing a prescribed reception operation when said indicated reception operation is determined impossible to be performed.

26. The reception operation control program according to claim 25, wherein
said radio terminal apparatus is a radio terminal apparatus performing transmission and reception with one antenna, and
said step of performing the reception operation includes a step of performing a reception operation with said one antenna in response to said signal indicating the adaptive array reception operation.

27. The reception operation control program according to claim 25, wherein
said radio terminal apparatus is a radio terminal apparatus that can perform diversity reception with a plurality of antennas, and
said step of performing the reception operation includes a step of performing a reception operation in which a reception diversity operation selecting an antenna with a higher reception level among said plurality of antennas and performing reception is stopped, and an antenna used for a signal transmission to the radio base station apparatus among said plurality of antennas is used for an immediately following reception operation with the radio base station apparatus in response to said signal indicating the adaptive array reception operation.

28. The reception operation control program according to claim 25, wherein
said radio terminal apparatus is a radio terminal apparatus that can perform the adaptive array reception with a plurality of antennas, and
said step of performing the reception operation includes a step of performing the adaptive array reception operation in response to said signal indicating the adaptive array reception operation.

29. The reception operation control program according to claim 28, wherein
said prescribed reception operation that is performed when said indicated reception operation is determined impossible to be performed is a reception operation in which a reception diversity operation selecting an antenna with a higher reception level among said plurality of antennas and performing reception is stopped, and an antenna used for a signal transmission to the radio base station apparatus among said plurality of antennas is used for an immediately following reception operation from the radio base station apparatus.

30. The reception operation control program according to claim 28, wherein
said prescribed reception operation that is performed when said indicated reception operation is determined impossible to be performed is the adaptive array reception operation.

31. A reception operation control program for controlling a reception operation in a radio terminal apparatus that can connect to a radio base station apparatus, said radio base station apparatus to be connected performing a transmission operation without transmission directivity to said radio terminal apparatus, said radio base station apparatus including transmission means for transmitting to said radio terminal apparatus a signal indicating a reception operation adapted to a transmission operation of said radio base station apparatus in response to a connection request from said radio terminal apparatus, and said transmission means transmitting a signal indicating a diversity reception operation to said radio terminal apparatus constantly, even when a radio wave environment between the radio base station apparatus and said radio terminal apparatus changes, said reception operation control program causing a computer to execute the steps of:
performing a connection request to said radio base station apparatus to connect to;
receiving said signal indicating the reception operation transmitted from said radio base station apparatus in response to said connection request;
determining whether said reception operation indicated by said received signal is possible to be performed or not; and
performing the reception operation when said indicated reception operation is determined possible to be performed, and performing a prescribed reception operation when said indicated reception operation is determined impossible to be performed.

32. The reception operation control program according to claim 31, wherein
said radio terminal apparatus is a radio terminal apparatus performing transmission and reception with one antenna, and
said step of performing the reception operation includes a step of performing a reception operation with said one antenna in response to said signal indicating the diversity reception operation.

33. The reception operation control program according to claim 31, wherein
said radio terminal apparatus is a radio terminal apparatus that can perform diversity reception with a plurality of antennas, and
said step of performing the reception operation includes a step of performing the diversity reception operation in response to said signal indicating the diversity reception operation.

34. The reception operation control program according to claim 31, wherein
said radio terminal apparatus is a radio terminal apparatus that can perform adaptive array reception with a plurality of antennas, and
said step of performing the reception operation includes a step of performing the diversity reception operation in response to said signal indicating the diversity reception operation.

35. A radio base station apparatus to which a radio terminal apparatus can connect, said radio base station apparatus performing a transmission operation with transmission directivity to said radio terminal apparatus, and said radio terminal apparatus including means for transmitting to said radio base station apparatus terminal operation information identifying a type of a reception operation of said radio terminal apparatus, said radio base station apparatus comprising:
reception means for receiving a connection request and said terminal operation information from said radio terminal apparatus; and
indicating signal transmitting means for transmitting to said radio terminal apparatus a signal indicating a reception operation adapted to a transmission operation of said radio base station apparatus in response to said terminal operation information, wherein
said indicating signal transmitting means include
means for determining whether said radio terminal apparatus is a radio terminal apparatus that can perform diversity reception with a plurality of antennas or not based on said terminal operation information, means for transmitting to said radio terminal apparatus a signal indicating a reception operation in which an antenna used for a signal transmission to the radio base station apparatus among said plurality of antennas is used for an immediately following reception operation from the radio base station apparatus constantly, even when a radio wave environment between the radio base station apparatus and said radio terminal apparatus changes, when said radio terminal apparatus is determined to be a radio terminal apparatus that can perform diversity reception, means for determining whether said radio terminal apparatus is a radio terminal apparatus that can perform adaptive array reception with a plurality of antennas or not based on said terminal operation information, means for transmitting to said radio terminal apparatus a signal indicating the adaptive array reception operation constantly, even when a radio wave environment between the radio base station apparatus and said radio terminal apparatus changes, when said radio terminal apparatus is determined to be a radio terminal apparatus that can perform adaptive array reception, means for determining whether said radio terminal apparatus is a radio terminal apparatus that performs transmission and reception with one antenna or not based on said terminal operation information, means for transmitting to said radio terminal apparatus a signal indicating a reception operation fixing to said one antenna constantly, even when a radio wave environment between the radio base station apparatus and said radio terminal apparatus changes, when said radio terminal apparatus is determined to be a radio terminal apparatus that performs transmission and reception with one antenna, and means for transmitting to said radio terminal apparatus a signal indicating a reception operation fixing to a specific antenna constantly, even when a radio wave environment between the radio base station apparatus and said radio terminal apparatus changes, when said radio terminal apparatus is determined not to be any of a radio terminal apparatus that can perform diversity reception, a radio terminal apparatus that can perform adaptive array reception, and a radio terminal apparatus performing transmission and reception with one antenna based on said terminal operation information.

36. A radio base station apparatus to which a radio terminal apparatus can connect, said radio base station apparatus performing a transmission operation without transmission directivity to said radio terminal apparatus, and said radio terminal apparatus including means for transmitting to said radio base station apparatus terminal operation information identifying a type of a reception operation of said radio terminal apparatus, said radio base station apparatus comprising:
reception means for receiving a connection request and said terminal operation information from said radio terminal apparatus; and
indicating signal transmitting means for transmitting to said radio terminal apparatus a signal indicating a reception operation adapted to a transmission operation of said radio base station apparatus in response to said terminal operation information, wherein
said indicating signal transmitting means include
means for determining whether said radio terminal apparatus is a radio terminal apparatus that can perform diversity reception with a plurality of antennas or not based on said terminal operation information, means for transmitting to said radio terminal apparatus a signal indicating a diversity reception operation constantly, even when a radio wave environment between the radio base station apparatus and said radio terminal apparatus changes, when said radio terminal apparatus is determined to be a radio terminal apparatus that can perform diversity reception, means for determining whether said radio terminal apparatus is a radio terminal apparatus that can perform adaptive array reception with a plurality of antennas or not based on said terminal operation information, means for transmitting to said radio terminal apparatus a signal indicating the adaptive array reception operation constantly, even when a radio wave environment between the radio base station apparatus and said radio terminal apparatus changes, when said radio terminal apparatus is determined to be a radio terminal apparatus that can perform adaptive array reception, means for determining whether said radio terminal apparatus is a radio terminal apparatus that performs transmission and reception with one antenna or not based on said terminal operation information, means for transmitting to said radio terminal apparatus a signal indicating a reception operation fixing to said one antenna constantly, even when a radio wave environment between the radio base station apparatus and said radio terminal apparatus changes, when said radio terminal apparatus is determined to be a radio terminal apparatus that performs transmission and reception with one antenna, and means for transmitting to said radio terminal apparatus a signal indicating a reception operation fixing to a specific antenna constantly, even when a radio wave environment between the radio base station apparatus and said radio terminal apparatus changes, when said radio terminal apparatus is determined not to be any of a radio terminal apparatus that can perform diversity reception, a radio terminal apparatus that can perform adaptive array reception, and a radio terminal apparatus performing transmission and reception with one antenna based on said terminal operation information.

37. A mobile communication system comprising a radio base station apparatus and a radio terminal apparatus, wherein said radio base station apparatus performs a transmission operation with transmission directivity to said radio terminal apparatus, and includes reception means for receiving a connection request and terminal operation information identifying a type of reception operation of said radio terminal apparatus from said radio terminal apparatus, and indicating signal transmission means for transmitting to said radio terminal apparatus a signal indicating a reception operation adapted to the transmission operation of said radio base station apparatus in response to said terminal operation information;

said radio terminal apparatus includes means for performing said connection request to said radio base station apparatus to connect to, means for transmitting said terminal operation information to said base station to be connected, means for receiving said signal indicating the reception operation transmitted from said radio base station apparatus in response to said terminal operation information, and means for performing the reception operation indicated by said received signal;

said indicating signal transmitting means of said radio base station apparatus include means for determining whether said radio terminal apparatus is a radio terminal apparatus that can perform diversity reception with a plurality of antennas or not based on said terminal operation information, means for transmitting to said radio terminal apparatus a signal indicating a reception operation in which a reception diversity operation selecting an antenna with a higher reception level among said plurality of antennas and performing reception is stopped, and an antenna used for a signal transmission to the radio base station apparatus among said plurality of antennas is used for an immediately following reception operation from the radio base station apparatus constantly, even when a radio wave environment between the radio base station apparatus and said radio terminal apparatus changes, when said radio terminal apparatus is determined to be a radio terminal apparatus that can perform diversity reception, means for determining whether said radio terminal apparatus is a radio terminal apparatus that can perform adaptive array reception with a plurality of antennas or not based on said terminal operation information, means for transmitting to said radio terminal apparatus a signal indicating the adaptive array reception operation constantly, even when a radio wave environment between the radio base station apparatus and said radio terminal apparatus changes, when said radio terminal apparatus is determined to be a radio terminal apparatus that can perform adaptive array reception, means for determining whether said radio terminal apparatus is a radio terminal apparatus that performs transmission and reception with one antenna or not based on said terminal operation information, means for transmitting to said radio terminal apparatus a signal indicating a reception operation fixing to said one antenna constantly, even when a radio wave environment between the radio base station apparatus and said radio terminal apparatus changes, when said radio terminal apparatus is determined to be a radio terminal apparatus that performs transmission and reception with one antenna, and means for transmitting to said radio terminal apparatus a signal indicating a reception operation fixing to a specific antenna constantly, even when a radio wave environment between the radio base station apparatus and said radio terminal apparatus changes, when said radio terminal apparatus is determined not to be any of a radio terminal apparatus that can perform diversity reception, a radio terminal apparatus that can perform adaptive array reception, and a radio terminal apparatus performing transmission and reception with one antenna based on said terminal operation information.

38. A mobile communication system comprising a radio base station apparatus and a radio terminal apparatus, wherein said radio base station apparatus performs a transmission operation without transmission directivity to said radio terminal apparatus, and includes reception means for receiving a connection request and terminal operation information identifying a type of reception operation of said radio terminal apparatus from said radio terminal apparatus, and indicating signal transmission means for transmitting to said radio terminal apparatus a signal indicating a reception operation adapted to the transmission operation of said radio base station apparatus in response to said terminal operation information;

said radio terminal apparatus includes means for performing said connection request to said radio base station apparatus to connect to, means for transmitting said terminal operation information to said base station apparatus to connect to, means for receiving said signal indicating the reception operation transmitted from said radio base station apparatus in response to said terminal operation information, and means for performing the reception operation indicated by said received signal;

said indicating signal transmitting means of said radio base station apparatus include means for determining whether said radio terminal apparatus is a radio terminal apparatus that can perform diversity reception with a plurality of antennas or not based on said terminal operation information, means for transmitting to said radio terminal apparatus a signal indicating a diversity reception operation constantly, even when a radio wave environment between the radio base station apparatus and said radio terminal apparatus changes, when said radio terminal apparatus is determined to be a radio terminal apparatus that can perform diversity reception, means for determining whether said radio terminal apparatus is a radio terminal apparatus that can perform adaptive array reception with a plurality of antennas or not based on said terminal operation information, means for transmitting to said radio terminal apparatus a signal indicating the adaptive array reception operation constantly, even when a radio wave environment between the radio base station apparatus and said radio terminal apparatus changes, when said radio terminal apparatus is determined to be a radio terminal apparatus that can perform adaptive array reception, means for determining whether said radio terminal apparatus is a radio terminal apparatus that performs transmission and reception with one antenna or not based on said terminal operation information, means for transmitting to said radio terminal apparatus a signal indicating a reception operation fixing to said one antenna constantly, even when a radio wave environment between the radio base station apparatus and said radio terminal apparatus changes, when said radio terminal apparatus is determined to be a radio terminal apparatus that performs transmission and reception with one antenna, means for transmitting to said radio terminal apparatus a signal indicating a reception operation fixing to a specific antenna constantly, even when a radio wave environment between the radio base station apparatus and said radio terminal apparatus changes, when said radio terminal apparatus is determined not to be any of a radio terminal apparatus that can perform diversity reception, a radio terminal apparatus that can perform adaptive array reception, and a radio terminal apparatus performing transmission and reception with one antenna based on said terminal operation information.

39. A reception operation control program for controlling, in a radio base station apparatus to which a radio terminal apparatus can connect, a reception operation of a radio terminal apparatus that is to connect to said radio base station apparatus, said radio base station apparatus performing a transmission operation with transmission directivity to said radio terminal apparatus, said radio terminal apparatus including means for transmitting to said radio base station apparatus terminal operation information identifying a type of a reception operation of said radio terminal apparatus, said reception operation control program causing a computer to execute the steps of:

receiving a connection request and said terminal operation information from said radio terminal apparatus; and transmitting to said radio terminal apparatus a signal indicating a reception operation adapted to a transmission operation of said radio base station apparatus in response to said terminal operation information, wherein said step of transmitting the indicating signal includes the steps of determining whether said radio terminal apparatus is a radio terminal apparatus that can perform diversity reception with a plurality of antennas or not based on said terminal operation information, transmitting to said radio terminal apparatus a signal indicating a reception operation in which a reception diversity operation selecting an antenna with a higher reception level among said plurality of antennas and performing reception is stopped, and an antenna used for a signal transmission to the radio base station apparatus among said plurality of antennas is used for an immediately following reception operation from the radio base station apparatus constantly, even when a radio wave environment between the radio base station apparatus and said radio terminal apparatus changes, when said radio terminal apparatus is determined to be a radio terminal apparatus that can perform diversity reception, determining whether said radio terminal apparatus is a radio terminal apparatus that can perform adaptive array reception with a plurality of antennas or not based on said terminal operation information, transmitting to said radio terminal apparatus a signal indicating the adaptive array reception operation constantly, even when a radio wave environment between the radio base station apparatus and said radio terminal apparatus changes, when said radio terminal apparatus is determined to be a radio terminal apparatus that can perform adaptive array reception, determining whether said radio terminal apparatus is a radio terminal apparatus that performs transmission and reception with one antenna or not based on said terminal operation information, transmitting to said radio terminal apparatus a signal indicating a reception operation fixing to said one antenna constantly, even when a radio wave environment between the radio base station apparatus and said radio terminal apparatus changes, when said radio terminal apparatus is determined to be a radio terminal apparatus that performs transmission and reception with one antenna, and transmitting to said radio terminal apparatus a signal indicating a reception operation fixing to a specific antenna constantly, even when a radio wave environment between the radio base station apparatus and said radio terminal apparatus changes, when said radio terminal apparatus is determined not to be any of a radio terminal apparatus that can perform diversity reception, a radio terminal apparatus that can perform adaptive array reception, and a radio terminal apparatus performing transmission and reception with one antenna based on said terminal operation information.

40. A reception operation control program for controlling, in a radio base station apparatus to which a radio terminal apparatus can connect, a reception operation of a radio terminal apparatus that is to connect to said radio base station apparatus, said radio base station apparatus performing a transmission operation without transmission directivity to said radio terminal apparatus, and said radio terminal apparatus including means for transmitting to said radio base station apparatus terminal operation information identifying a type of a reception operation of said radio terminal apparatus, wherein said reception operation control program causing a computer to execute the steps of:

receiving a connection request and said terminal operation information from said radio terminal apparatus; and transmitting to said radio terminal apparatus a signal indicating a reception operation adapted to a transmission operation of said radio base station apparatus in response to said terminal operation information, wherein said step of transmitting an indicating signal includes the steps of determining whether said radio terminal apparatus is a radio terminal apparatus that can perform diversity reception with a plurality of antennas or not based on said terminal operation information, transmitting to said radio terminal apparatus a signal indicating a diversity reception operation constantly, even when a radio wave environment between the radio base station apparatus and said radio terminal apparatus changes, when said radio terminal apparatus is determined to be a radio terminal apparatus that can perform diversity reception, determining whether said radio terminal apparatus is a radio terminal apparatus that can perform adaptive array reception with a plurality of antennas or not based on said terminal operation information, transmitting to said radio terminal apparatus a signal indicating the adaptive array reception operation constantly, even when a radio wave environment between the radio base station apparatus and said radio terminal apparatus changes, when said radio terminal apparatus is determined to be a radio terminal apparatus that can perform adaptive array reception, determining whether said radio terminal apparatus is a radio terminal apparatus that performs transmission and reception with one antenna or not based on said terminal operation information, transmitting to said radio terminal apparatus a signal indicating a reception operation fixing to said one antenna constantly, even when a radio wave environment between the radio base station apparatus and said radio terminal apparatus changes, when said radio terminal apparatus is determined to be a radio terminal apparatus that performs transmission and reception with one antenna, and transmitting to said radio terminal apparatus a signal indicating a reception operation fixing to a specific antenna constantly, even when a radio wave environment between the radio base station apparatus and said radio terminal apparatus changes, when said radio terminal apparatus is determined not to be any of a radio terminal apparatus that can perform diversity reception, a radio terminal apparatus that can perform adaptive array reception, and a radio terminal apparatus performing transmission and reception with one antenna based on said terminal operation information.

* * * * *